(12) United States Patent
Kawanabe et al.

(10) Patent No.: US 7,301,668 B2
(45) Date of Patent: Nov. 27, 2007

(54) PRINTING APPARATUS WITH GENERATING MEANS FOR GENERATING A MASK PATTERN COMPRISING A PLURALITY OF PLANES, CONTROL METHOD THEREFOR, AND PROGRAM

(75) Inventors: Tetsuya Kawanabe, Kanagawa (JP); Hidehiko Kanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 798 days.

(21) Appl. No.: 10/162,903

(22) Filed: Jun. 6, 2002

(65) Prior Publication Data

US 2002/0186386 A1 Dec. 12, 2002

(30) Foreign Application Priority Data

Jun. 7, 2001 (JP) .............................. 2001-172738

(51) Int. Cl.
- *G06K 1/00* (2006.01)
- *G06K 15/10* (2006.01)
- *H04N 1/032* (2006.01)
- *H04N 1/405* (2006.01)
- *G06F 15/00* (2006.01)

(52) U.S. Cl. .................. 358/1.8; 358/1.6; 358/1.16; 358/1.17; 358/3.06; 358/3.13; 358/3.16

(58) Field of Classification Search .............. 358/1.6, 358/1.18, 1.8, 1.16, 1.17, 3.06, 3.13, 3.16; 347/15

See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,818,474 A | 10/1998 | Takahashi et al. | 347/15 |
| 6,042,212 A | 3/2000 | Takahashi et al. | 347/15 |
| 6,142,604 A | 11/2000 | Kanda et al. | 347/41 |
| 6,183,055 B1 | 2/2001 | Kanematsu et al. | 347/9 |
| 6,378,982 B2 | 4/2002 | Ono et al. | 347/41 |

FOREIGN PATENT DOCUMENTS

| | | |
|---|---|---|
| JP | 59-123670 | 7/1984 |
| JP | 59-138461 | 8/1984 |
| JP | 7-52390 | 2/1995 |
| JP | 10-235852 | 9/1998 |

*Primary Examiner*—Twyler Lamb
*Assistant Examiner*—Myles D. Robinson
(74) *Attorney, Agent, or Firm*—Fitzpatrick, Cella, Harper & Scinto

(57) ABSTRACT

A CPU generates a mask pattern by generating patterns corresponding to a predetermined number of times in the sub-scanning direction in accordance with the number of printing elements of a printhead which corresponds to the amount by which scanning is performed once in the sub-scanning direction, and repeating this operation by the number of times corresponding to a predetermined number of columns. The generated mask pattern is stored in an RAM. An image is then printed by using image data and the mask pattern stored in the RAM for each printing timing signal in the main scanning direction.

20 Claims, 19 Drawing Sheets

FOR A COLUMN
(1) PT1s=PT1A, (2) PT1p=PT1A, (3) PT2s=PT2A, (4) PT2p=PT2A
(5) PT3s=PT3A, (6) PT3p=PT3A, (7) PT4s=PT4A, (8) PT4p=PT4A

FOR B AND C COLUMNS (n IS B OR C)
(1) WK=PT1n AND PT1p, (2) PT1n=PT1n EOR WK, (3) PT2n=PT2n OR WK
(4) WK=PT2n AND PT2p, (5) PT2n=PT2n EOR WK, (6) PT3n=PT3n OR WK
(7) WK=PT3n AND PT3p, (8) PT3n=PT3n EOR WK, (9) PT4n=PT4n OR WK
(10) WK=PT4n AND PT4p, (11) PT4n=PT4n EOR WK, (12) PT1n=PT1n OR WK
(13) PT1p=PT1n, (14) PT2p=PT2n, (15) PT3p=PT3n, (16) PT4p=PT4n

FOR D COLUMN
(1) WK=PT1D AND (PT1p OR PT1s), (2) PT1D=PT1D EOR WK, (3) PT2D=PT2D OR WK
(4) WK=PT2D AND (PT2p OR PT2s), (5) PT2D=PT2D EOR WK, (6) PT3D=PT3D OR WK
(7) WK=PT3D AND (PT3p OR PT3s), (8) PT3D=PT3D EOR WK, (9) PT4D=PT4D OR WK
(10) WK=PT4D AND (PT4p OR PT4s), (11) PT4D=PT4D EOR WK, (12) PT1D=PT1D OR WK
(13) WK=PT1D AND (PT1p OR PT1s), (14) PT1D=PT1D EOR WK, (15) PT2D=PT2D OR WK
(16) WK=PT2D AND (PT2p OR PT2s), (17) PT2D=PT2D EOR WK, (18) PT3D=PT3D OR WK

|   | A | B   | C | D   |
|---|---|-----|---|-----|
| 1 | 1 | 1→0 | 0 | 0   |
| 2 | 0 | 0   | 0 | 0   |
| 3 | 0 | 1   | 0 | 0→1 |

PT2'

|   | A | B   | C   | D |
|---|---|-----|-----|---|
| 1 | 0 | 0→1 | 1→0 | 0 |
| 2 | 1 | 0   | 0   | 1 |
| 3 | 0 | 0   | 0   | 0 |

PT3'

|   | A | B | C   | D   |
|---|---|---|-----|-----|
| 1 | 0 | 0 | 0→1 | 1→0 |
| 2 | 0 | 1 | 0   | 0   |
| 3 | 0 | 0 | 1   | 0   |

PT4'

|   | A | B | C | D   |
|---|---|---|---|-----|
| 1 | 0 | 0 | 0 | 0→1 |
| 2 | 0 | 0 | 1 | 0   |
| 3 | 1 | 0 | 0 | 1→0 |

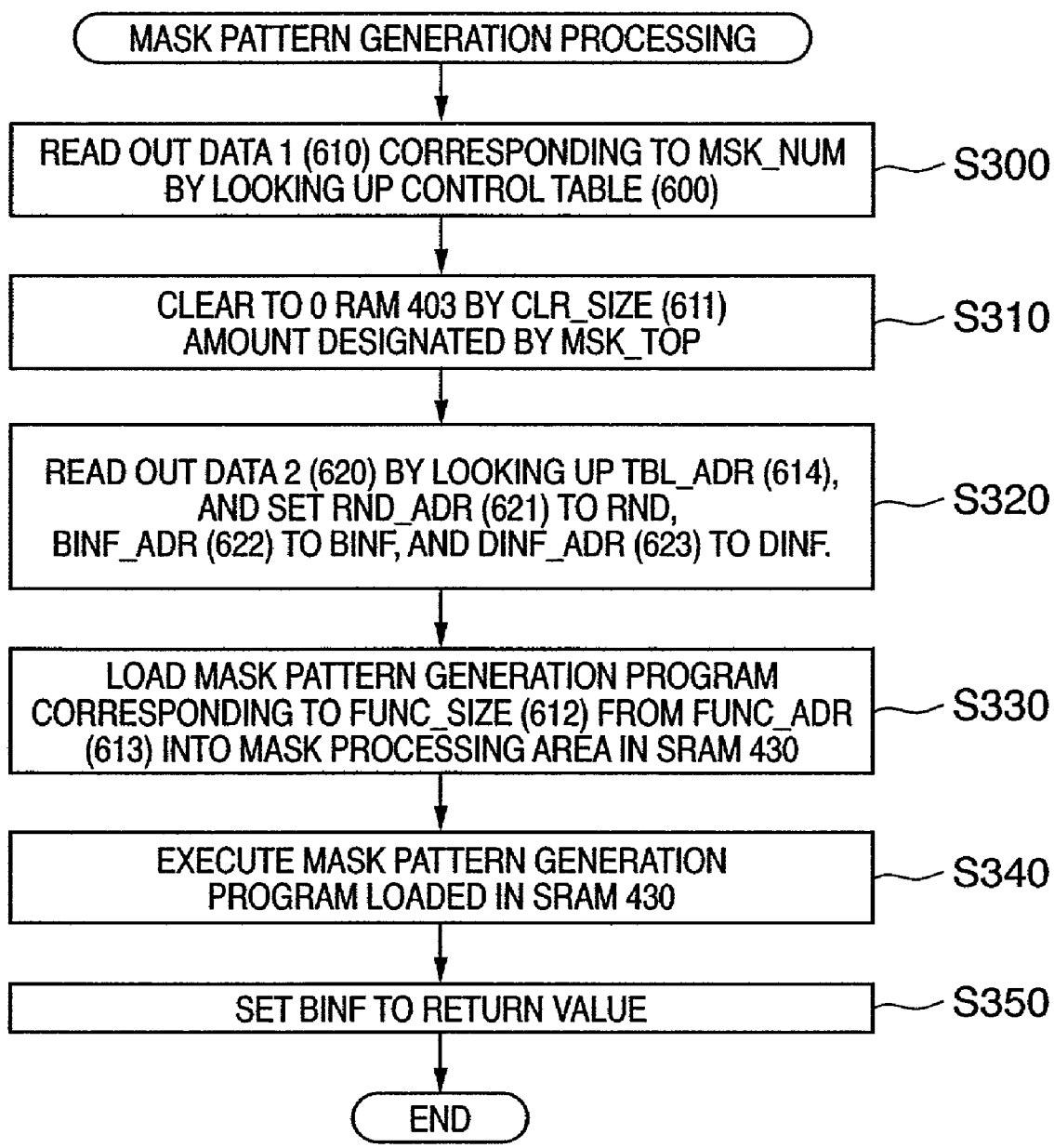

PRINTING APPARATUS WITH GENERATING MEANS FOR GENERATING A MASK PATTERN COMPRISING A PLURALITY OF PLANES, CONTROL METHOD THEREFOR, AND PROGRAM

FIELD OF THE INVENTION

The present invention relates to a printing apparatus which forms an image on a printing medium by complementarily printing a thinned-out image while scanning a printhead having a plurality of printing elements over a predetermined area on the printing medium a plural number of times in the main scanning direction through at least one scanning in the sub-scanning direction.

BACKGROUND OF THE INVENTION

An image forming apparatus such as a printer, copying machine, or facsimile apparatus or an image forming apparatus used as an output device for a composite electronic device or workstation such as a computer or wordprocessor is designed to print desired information such as characters and images on a printing medium such as a paper sheet on the basis of image information.

Such image forming apparatuses can be classified into the ink-jet type, wire-dot type, thermal type, laser beam type, and the like.

For example, an ink-jet printer using an ink-jet type printhead is designed to print by discharging ink from the printhead onto a printing medium, and has the following advantages.

This printer allows easy miniaturization of the printhead and can print a high-resolution image at high speed. In addition, the printer can print an image on plain paper without requiring any special treatment, operates at a low running cost, and produces low noise because of the non-impact type. Furthermore, the printer can easily print a color image by using multiple color inks.

In a serial printer designed to complete an image by performing scanning a plural number of times, i.e., discharging ink onto a printing medium by reciprocally scanning such an ink-jet type printhead, density irregularity may occur due to the influence of convey precision or streaks appear on a printed image due to variations in the discharging operation of the printhead, resulting in a deterioration in print quality, depending on the convey precision of a printing medium such as a printing paper sheet or the discharging performance of the printhead.

In order to solve such a problem, a multipass printing scheme has been proposed, in which the same partial printing area on a printing medium is scanned by different areas of a printhead a plural number of times to complete printing on the partial printing area.

In this multipass printing scheme, a mask pattern with a predetermined size is applied (ANDing) to original image data to decrease the number of pixels to be printed by one scanning operation by the printhead, and different printing elements (nozzles) of the printhead are used to discharge ink in each scanning operation. In addition, printing is performed with the unit of transfer of a printing medium being set to be shorter than the printing width of the printhead. This makes it possible to suppress density irregularity and the generation of streaks due to the concentration of variations in discharge performance among the printing elements of the printhead on a specific place.

As such a conventional technique, a method using a mask matrix having a random mask pattern distribution in an area having a predetermined size is disclosed in Japanese Patent Laid-Open No. 7-52390. A printing scheme is also disclosed in Japanese Patent Laid-Open No. 10-235852, which uses a mask pattern in which at least one of the resolutions in the main scanning direction which is the scanning direction of a printhead and the sub-scanning direction which is the convey direction of a printing medium is lower than the print resolution. In the multipass printing scheme using such a random mask matrix, since the discharge period becomes irregular in the main/sub-scanning direction, density irregularity and the generation of streaks are prevented. It is also known that since the mask pattern is random, the possibility that print data may tune with the mask pattern can be made very low.

Assume that an image is to be printed on a printing medium at a resolution higher than the spacing intervals of the printing elements on the printhead which are arrayed in the sub-scanning direction. In this case, in general, a scheme of printing an image by multipass printing upon setting the driving resolution of the convey amount of a printing medium in the sub-scanning direction to the desired resolution.

If, however, the driving resolution of the printing medium convey mechanism is set in accordance with the print resolution in the sub-scanning direction as described above, high-precision parts need to be used as mechanical parts such as gears constituting the printing medium convey mechanism, resulting in an increase in the cost of the printing medium convey mechanism. In order to increase the driving resolution in the sub-scanning direction, the drive amount of a constituent element such as a motor of the printing medium convey mechanism which corresponds to the convey amount of printing medium must be increased. As a method of solving this problem, a method of setting the diving resolution of the printing medium convey mechanism to be lower than the resolution in the sub-scanning direction of the printing medium contrary to the former method is available.

Assume that the resolution of printing element in the sub-scanning direction is 600 dpi, and the driving resolution of the printing medium convey mechanism is set to 400 dpi. With the use of this printing medium convey mechanism, a printing medium is conveyed by 1/400 inch by a convey driving pulse with an amount of 1. That is, if 600 dpi is regarded to correspond to one pixel, a printing medium can be conveyed by a convey amount corresponding to 1.5 pixels by a convey driving pulse with an amount of 1. If, therefore, multipass printing is performed with a convey driving pulse with an amount of 2n+1, printing can be done on the printing medium at a resolution of 1,200 dpi in the sub-scanning direction. In addition, since a printing medium can be conveyed by a convey amount corresponding to three pixels by using a convey driving pulse with an amount of 2n, a print resolution of 600 dpi can be achieved in the sub-scanning direction.

With this arrangement, an increase in the cost of a printing medium convey mechanism and a reduction in throughput can be suppressed. In order to perform multipass printing by using a printhead constituted by printing elements with a resolution of 600 dpi in the sub-scanning direction, interpolation printing must be done to perform multipass printing with a multiple of three pixels in the sub-scanning direction. In addition, although the conventional mask pattern technique is useful in printing out an image with little density irregularity and few streaks by performing multipass printing, the number of mask patterns in the sub-scanning direction needs to be equal to at least 8n or 16n pixels or constituted by 2n pixels. This makes it difficult to apply this technique to a printing apparatus having the above relationship between printing elements and the driving resolution of a printing medium convey mechanism.

SUMMARY OF THE INVENTION

The present invention has been made in consideration of the above problems, and has as its object to provide a printing apparatus, a control method therefor, and a program which can realize high-quality printing even with an arrangement in which the resolution of printing elements in the sub-scanning direction and the driving resolution of a convey system do not have a relationship defined by 2n.

According to an aspect of the present invention, the foregoing object is attained by providing a printing apparatus for forming an image on a printing medium by complementarily printing thinned-out images while scanning a printhead having a plurality of printing elements over a predetermined area on the printing medium in a main scanning direction a predetermined number of times through at least one scan in a sub-scanning direction, comprising generating means for generating a mask pattern by performing generation of patterns corresponding to the predetermined number of times in the sub-scanning direction in accordance with the number of printing elements of the printhead which corresponds to an amount by which the scan is performed once in the sub-scanning direction, and repeating the generation by the number of times corresponding to a predetermined number of columns, storage means for storing the mask pattern generated by the generating means, and printing means for printing an image for each printing timing signal in the main scanning direction by using image data and the mask pattern stored in the storage means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12A is a view showing a random number sequence for mask pattern generation according to the embodiment of the present invention;

FIG. 12C is a view showing an example of an adjacent dot inhibition computation method for mask patterns according to the embodiment of the present invention;

FIG. 12D is a view showing an example of the mask pattern to which an adjacent dot inhibition computation according to the embodiment of the present invention is applied;

FIG. 14 is a flow chart showing the details of mask pattern generation processing according to the embodiment of the present invention;

DETAILED DESCRIPTION OF THE PREFERRED EMBODIMENT

An embodiment of the present invention will be described in detail below with reference to the accompanying drawings.

Note that this embodiment will be described by exemplifying an image printing system in which an image forming apparatus is connected to a host apparatus for transmitting image print data to the imaging forming apparatus, wherein data can be transmitted/received between the host apparatus and the image forming apparatus.

Although a host computer and ink-jet printer having an ink-jet printhead will be described as the host apparatus and image forming apparatus, respectively, the scope of the present invention is not limited to the examples described below.

[Arrangement of Image Printing System]

Figure 1:
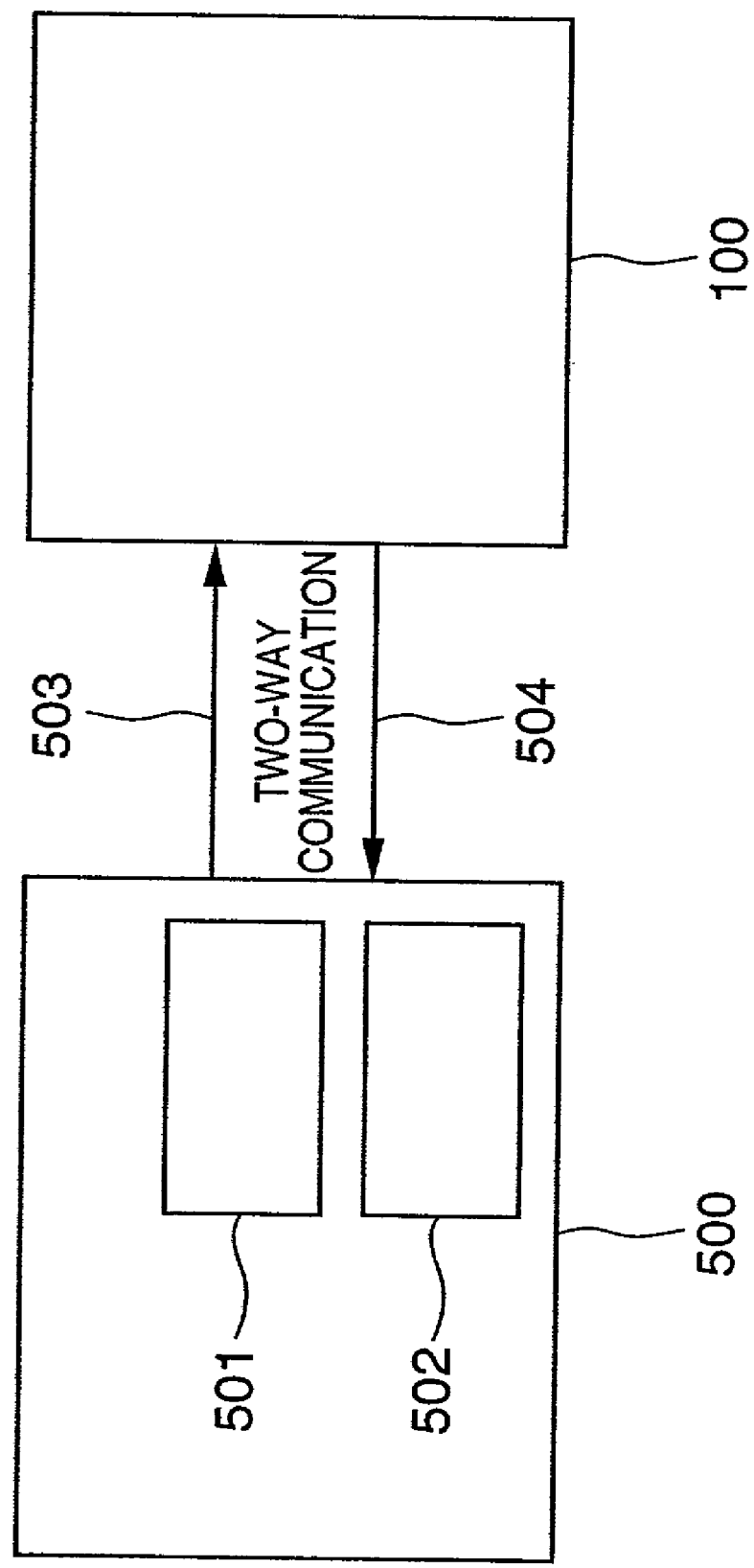
FIG. 1 is a block diagram showing the arrangement of an image printing system according to an embodiment of the present invention.

FIG. 1 is a block diagram showing the arrangement of an image printing system according to an embodiment of the present invention.

As shown in FIG. 1, the image printing system is formed by connecting a host computer 500 to an ink-jet printer 100.

In the host computer 500, reference numeral 501 denotes a printer driver; and 502, a status monitor. They are stored in the form of software.

Note that the host computer 500 has standard constituent elements (e.g., a CPU, RAM, ROM, hard disk, external storage device, network interface, display, keyboard, and mouse) are equipped in a general-purpose computer. In particular, the printer driver 501 and status monitor 502 are stored in a storage medium such as a ROM mounted in the host computer 500.

The ink-jet printer 100 has a control circuit shown in the block diagram of FIG. 3 to be described later.

The host computer 500 is connected to the ink-jet printer 100 via cables 503 and 504 by using a USB interface which is one of high-speed serial communication interfaces.

Note that this connection is not limited to the cables 503 and 504 using the USB interface and can be made by using any interface as long as two-way communication can be performed. For example, the connection can be made by using parallel interface IEEE 1284, high-speed serial interface IEEE 1394, infrared interface, radio communication interface such as Bluetooth or IEEE 802.11b.

When a user is to print a desired document or image by using the ink-jet printer 100, he/she gives an instruction on the host computer 500 to print the desired document or image.

With this operation, the printer driver 501 generates print data from the original data of the desired document or image by performing image processing such as color processing and halftoning. Information indicating the type of printing medium selected/designated by the user, selection information indicating print quality, and a printing mode setting command for designating monochrome/color identification information which indicates whether the print data is printed in monochrome or color are added to this print data. The resultant data is transmitted to the ink-jet printer 100.

The ink-jet printer 100 then outputs an image onto a printing medium such as a paper sheet on the basis of the received print data, thus allowing the user to obtain the desired document or image. The ink-jet printer 100 determines a printing direction, print resolution, pass count, and the like to perform optimal printing control so as to output an image with the designated print quality onto the designated printing medium in accordance with a combination of monochrome/color identification information, printing medium, and print quality designated by the printing mode setting command in the print data.

The status monitor 502 is activated during printing operation or by predetermined operation. The status monitor 502 receives status information from the connected ink-jet printer 100, analyzes the state of the ink-jet printer 100 on the basis of the status information, and can display the analysis contents on an operation window or the like on the host computer 500, as needed.

[Arrangement of Ink-jet Printer]

Figure 2:
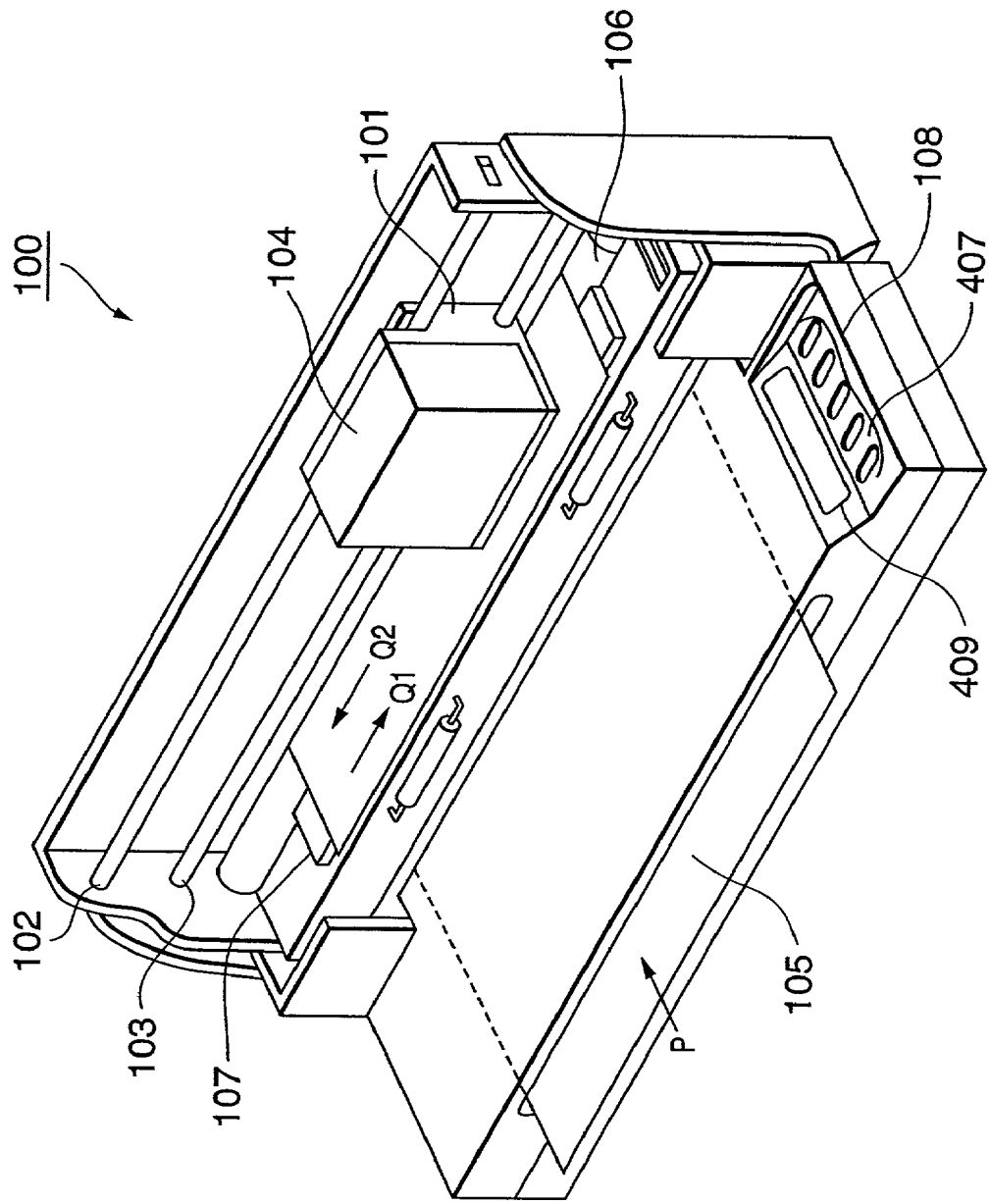
FIG. 2 is a perspective view showing the arrangement of an ink-jet printer according to the embodiment of the present invention.

FIG. 2 is a perspective view showing the arrangement of the ink-jet printer 100 according to the embodiment of the present invention.

Referring to FIG. 2, a printing medium 105 such as a printing sheet inserted at the paper feed position of the ink-jet printer 100 is conveyed in the direction indicated by an arrow P upon rotation of a convey roller 106 and conveyed to the printable area of a printhead 104.

A platen 107 is placed below the printing medium 105 in this printable area. The printhead 104 is mounted on a carriage 101. The carriage 101 can reciprocate along two guide shafts, i.e., guide shafts 102 and 103, in their axial direction. That is, the printhead 104 reciprocally scans the print area in the main scanning direction (the directions indicated by arrow Q1 and Q2 in FIG. 2).

The printhead 104 includes orifices that can discharge multiple color inks and ink tanks that can store multiple color inks. The orifices of the printhead 104 face downward.

The multiple color inks in the ink-jet printer 100 are, for example, four color inks, namely Bk (black), C (cyan), M (magenta), and Y (yellow) inks. In this embodiment, the printhead 104 has 320 nozzles as printing elements for discharging black ink and 128 nozzles as printing elements for discharging yellow, magenta, or cyan ink. These nozzles are arranged at a resolution of 600 dpi in the sub-scanning direction (the direction indicated by the arrow P in FIG. 2) for the respective colors. In practicing the present invention, the arrangement resolution of printing elements may be set to a resolution other than 600 dpi, for example, 300 dpi or 1,200 dpi. In addition, printing elements may be arranged at different resolutions depending on the ink colors. For example, the arrangement resolution of the printing elements for discharging black ink may be set to 300 dpi, whereas the arrangement resolution of the printing elements for discharging color inks may be set to 600 dpi.

Reference numeral 108 denotes an operation panel having a sensor/SW (switch) unit 407 and a display unit 409 having an LED, liquid crystal display element, and the like. For example, the sensor/SW unit 407 is used to turn on/off the power of the ink-jet printer 100 and set various printing modes. The display unit 409 is used to display the state of the ink-jet printer 100.

[Control Arrangement for Ink-jet Printer]

Figure 3:
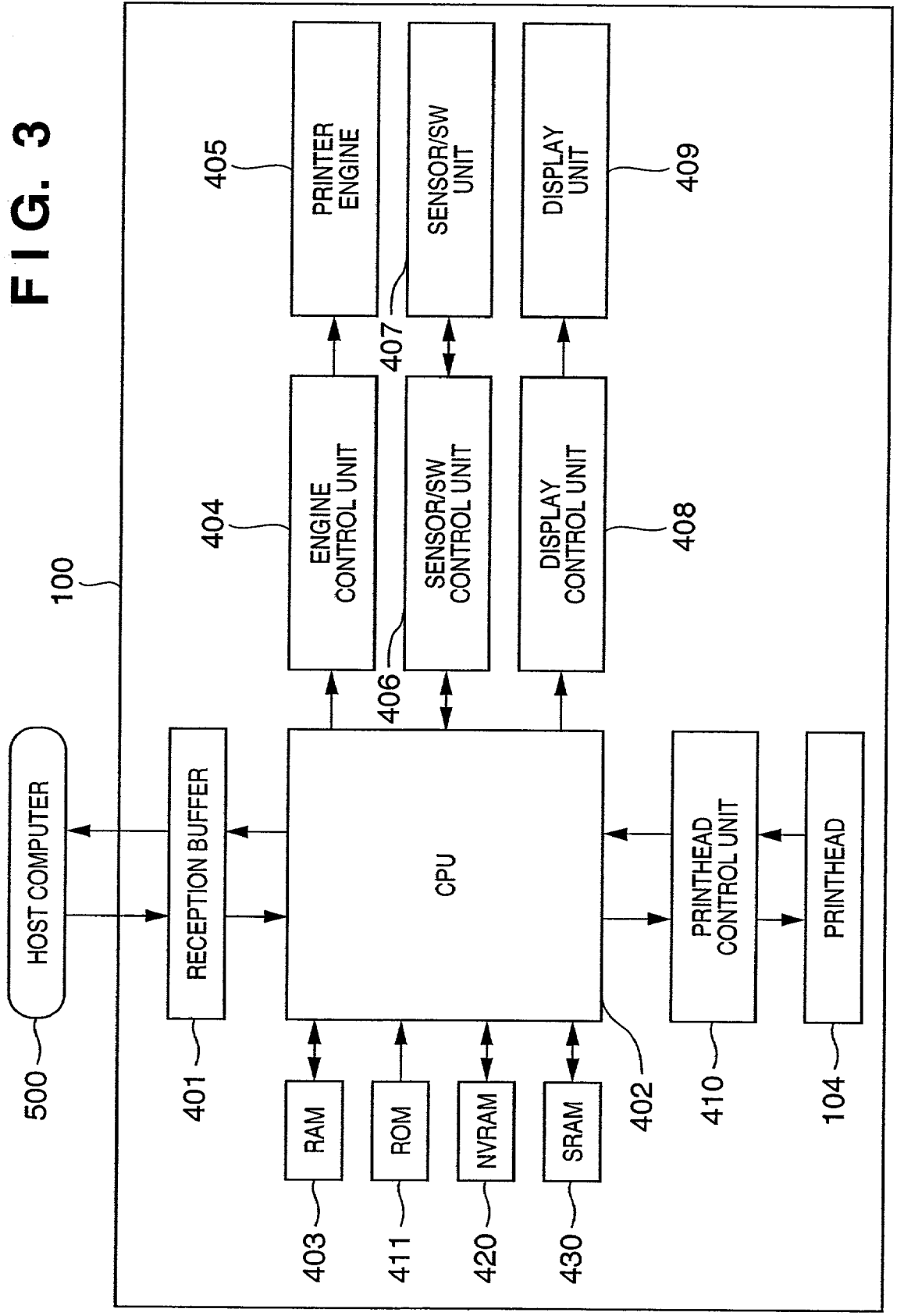
FIG. 3 is a block diagram showing a control arrangement for the ink-jet printer according to the embodiment of the present invention.

FIG. 3 is a block diagram showing a control arrangement for the ink-jet printer 100 according to the embodiment of the present invention.

When the ink-jet printer 100 receives print data including a character or image to be printed, which is transmitted from the host computer 500, the received print data is input to and held in a reception buffer 401.

The print data held in the reception buffer 401 is transferred to a RAM 403 and temporarily stored therein under the control of a CPU 402. The RAM 403, which is a so-called DRAM, is connected to the external bus of the CPU 402. It takes a wait time corresponding to several clocks for the CPU 402 to make read/write access to the RAM 403.

A program and data which are required to perform various control operations including processing to be executed in this embodiment are stored in a ROM 411. When the CPU 402 executes this program, the print data transmitted from the host computer 500 to the ink-jet printer 100 is printed or status information that notifies the operation state of the ink-jet printer 100 or the like is transmitted from the ink-jet printer 100 to the host computer 500.

The ROM 411 also stores control programs executed by the CPU 402, various initialization parameters, and the like. The ROM 411 is connected to the external bus of the CPU 402. It takes a wait time corresponding to several clocks for the CPU 402 to make read access to the CPU 402.

An SRAM 430 is a so-called static memory, which is connected to the local bus of the CPU 402. The SRAM 430 is a storage medium which can be accessed at high speed; the CPU 402 can make read/write access to the SRAM 430 without any wait time (0 wait). The SRAM 430 occupies a large area on a silicon chip in consideration of a semiconductor manufacturing method. For this reason, this memory is limited to a minimum necessary capacity to minimize, for example, a factor for an increase in cost.

In this embodiment, the SRAM 430 and RAM 403 respectively have capacities of 8 KBytes and 2 Mbytes. However, these memory capacities may be set to optimal values in consideration of the performance and cost of this apparatus and included in design items. The SRAM 430 has a small memory capacity, and hence is used for only control operations that need to be processed at high speed, e.g., carriage operation control on a printer engine 405 and mask pattern generation control.

An engine control unit 404 drives/controls the printer engine 405 having mechanical parts such as a carriage motor and line feed motor in accordance with commands from the CPU 402. The carriage motor in this embodiment is mounted on the carriage 101 and can move/control the printhead 104 at a maximum scanning speed of 25 inches/sec in the main scanning direction. The feed motor is a convey system which can convey/control the printing medium 105 in the sub-scanning direction at a driving resolution of 400 dpi by rotating/driving the convey roller 106 by a minimum of 1/400 inch.

The driving resolution of this convey system in the sub-scanning direction is not limited to 400 dpi. For example, when the resolution of printing elements in the sub-scanning direction is 600 dpi, the driving resolution of the convey system in the sub-scanning direction is set to 720 dpi. With this setting, the print resolution in the sub-scanning direction can be set to 1,200 dpi by performing multipass printing by conveying the printing medium 105 by 3/720 inches or 6n+3/720 inches using the convey system with respect to one printing operation of the printhead in the main scanning direction. Alternatively, the print resolution in the sub-scanning direction can be set to 600 dpi by performing single-pass printing/multipass printing by conveying the printing medium 105 by 6n/720 inches using the convey system with respect to one printing operation of the printhead 104 in the main scanning direction.

An NVRAM 420 is a nonvolatile memory, which stores set information to be stored even when the power of the ink-jet printer 100 is turned off.

The CPU 402 reads out set information stored in the NVRAM 420 at an initialization timing such as power-on timing of the ink-jet printer 100, stores the read contents in the RAM 403, and writes/updates the set information in the NVRAM 420 at power-off timing or a predetermined update timing. In this embodiment, as the NVRAM 420, an EEPROM (electrically erasable programmable ROM) is used. However, any type of nonvolatile memory can be used. For example, a memory with battery backup or flash memory can be used.

A sensor/SW control unit 406 receives signals from the sensor/SW unit 407 including various sensors, the SWs of the operation panel 108 (switches and cover closing/opening sensor), and the like, and transmits the received signals to the CPU 402.

A display control unit 408 performs display control on the display unit 409 of the operation panel 108 in accordance with a command from the CPU 402. A printhead control unit 410 drives/controls the printhead 104 in accordance with a command from the CPU 402. The printhead control unit 410 also monitors the state of the printhead 104. For example, the printhead control unit 410 detects the temperature of the printhead 104 and transmits the temperature information to the CPU 402. The CPU 402 then executes driving control on the printhead 104 on the basis of the temperature information.

The printhead 104 has two types of ink tanks, i.e., a black ink tank and a color ink tank integrally incorporating three color ink tanks, i.e., yellow, magenta, and cyan ink tanks. Each ink tank is detachably mounted in the printhead 104. In practicing the present invention, only one black ink tank may be used or ink colors and physical ink tanks may be arbitrarily combined, e.g., four or six color ink tanks are separately arranged.

The housing of the ink-jet printer 100 has a cover (not shown), whose open/closed state is acquired from the operation panel 108. If the cover is opened during printing operation, printing is temporarily stopped until the cover is closed. If the cover is opened while no printing is performed and no paper jam is caused, the printhead 104 is moved near the middle position in the scanning direction to allow the user to replace an ink tank with a new one.

[Detailed Arrangement of Printhead Control Unit 410]

Figure 4:
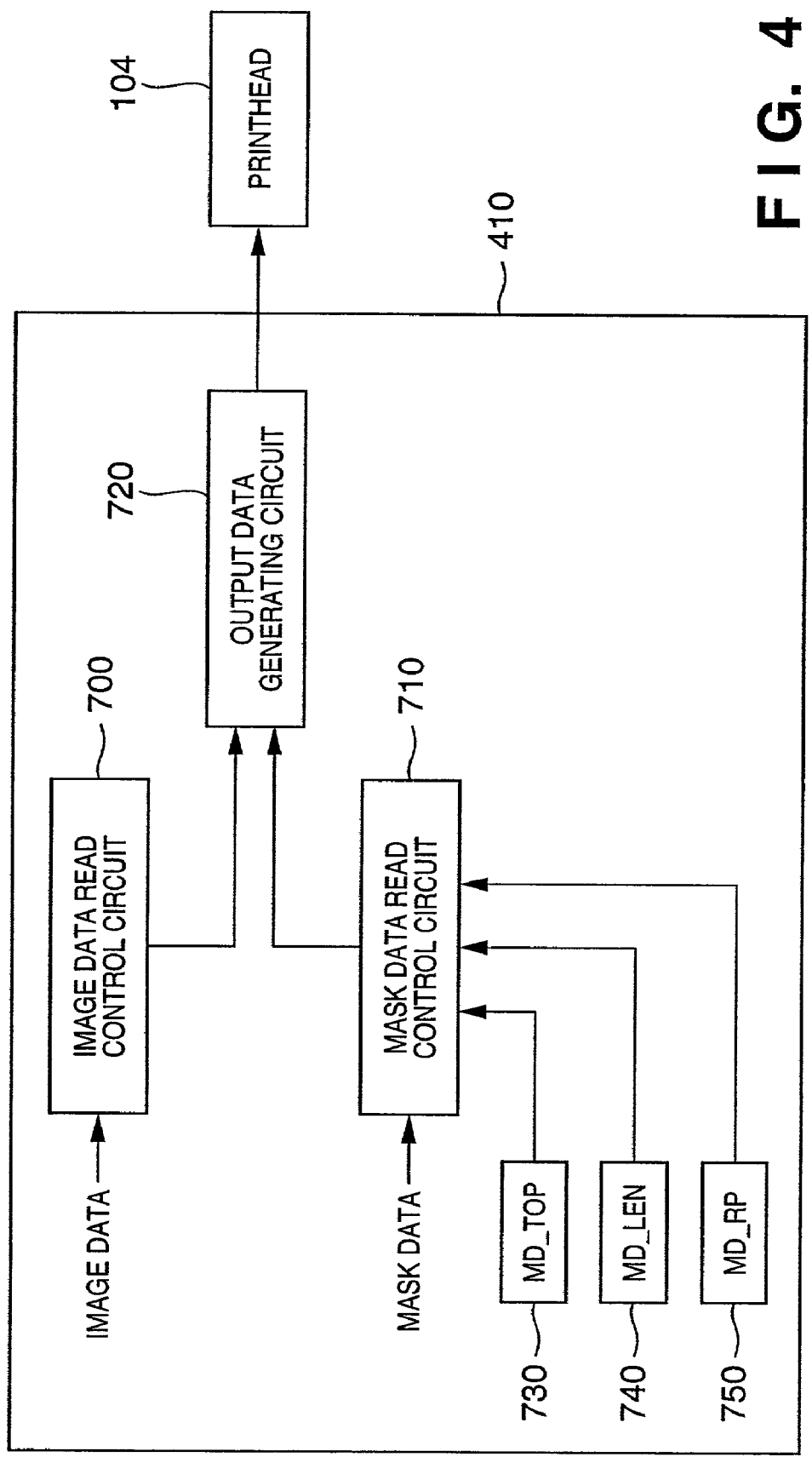
FIG. 4 is a block diagram showing the detailed arrangement of a printhead control unit according to the embodiment of the present invention.

FIG. 4 is a block diagram showing the detail arrangement of the printhead control unit 410 according to the embodiment of the present invention.

When a printing instruction is given by the CPU 402, an image data read control circuit 700 reads out a predetermined amount of image data in the sub-scanning direction from an image data area 403a (FIG. 5) of the RAM 403 at every predetermined printing timing. At the same time, a mask data read control circuit 710 reads out a predetermined amount of mask data from a mask data area 403b of the RAM 403 in accordance with the contents of parameter registers MD_TOP 730, MD_LEN 740, and MD_RP 750 which are set by printing control processing (to be described later) immediately before the printing instruction is output.

An output data generating circuit 720 calculates the logical product (AND) between the former image data and the latter mask data to thin out the image data and generate a printing timing signal for the printhead 104 so as to cause the printhead 104 to print an image based on the thinned-out image data.

The parameter registers MD_TOP 730, MD_LEN 740, and MD_RP 750 are formed from registers from/in which the CPU 402 can read/write data. The parameter register MD_TOP 730 holds the start address of a target mask data group as a physical address on the RAM 403. The parameter register MD_LEN 740 holds the data length of the mask data group. The parameter register MD_RP 750 indicates the read start position of the first mask data when a printing instruction is given, and holds a relative value (offset address value) seen from the start address of the mask data group which is set in the parameter register MD_TOP 730.

When a printing instruction is issued, the mask data read control circuit 710 adds the contents of the parameter register MD_RP 750 to the contents of the parameter register MD_LEN 740 at each printing timing to obtain a read address, and reads out desired mask data from the RAM 403 by one column.

The contents of the parameter register MD_RP 750 are then updated to read out mask data of the next column. More specifically, if, for example, the main scanning direction coincides with the direction indicated by the arrow Q2 in FIG. 2, a predetermined amount X is added to the value of the parameter register MD_RP 750 (MD_RP=MD_RP+X). If the value of the parameter register MD_RP 750 is equal to or more than the value of the parameter register MD_LEN 740, 0 is set in the parameter register MD_RP 750 to read out mask data in the form of a ring (cyclically) in the column direction which is the main scanning direction for printing.

If the main scanning direction is opposite to the former direction (the direction indicated by the arrow Q1 in FIG. 2), the predetermined amount X is subtracted from the contents of the parameter register MD_RP 750 (MD_RP=MD_RP−X). If the value of the parameter register MD_RP 750 is equal to or less than 0, the value obtained by subtracting the predetermined amount X from the value of the parameter register MD_RP 750 is set in the parameter register MD_RP 750 (MD_RP=MD_RP−X), thereby allowing mask data to be read in the form of a ring in the column direction.

Note that the above circuit arrangement may be prepared for each ink color or each nozzle array of printing elements and separately controlled to perform thinning-out printing control for each ink color or each nozzle array.

[Arrangements of Memories]

Figure 5:
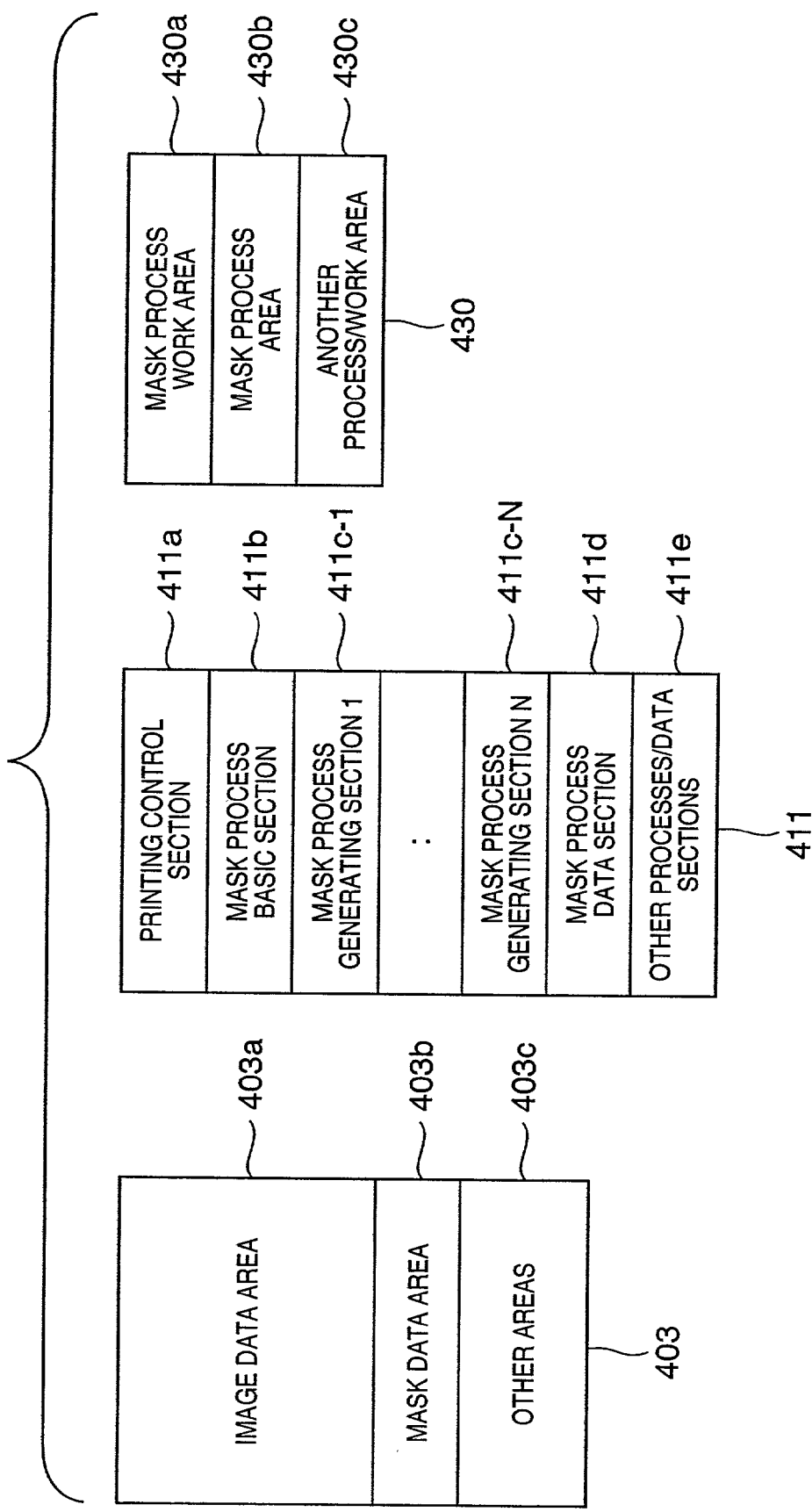
FIG. 5 is a block diagram showing the memory arrangements of a RAM, ROM, and SRAM according to the embodiment of the present invention.

FIG. 5 is a block diagram showing the arrangements of the RAM 403, ROM 411, and SRAM 430 according to the embodiment of the present invention.

The RAM 403 has the image data area 403*a* in which print data converted from image data for which a printing instruction is output from the host computer 500 is temporarily stored, the mask data area 403*b* which functions as a mask buffer (to be described later) and stores a mask pattern to be used for multipass printing, and other areas 403*c* including a temporary storage area for image data received via the reception buffer 401, a work area used for a system control program or other various control programs, and the like.

The programs and data which are read out and executed by the CPU 402 are stored in the ROM 411. The ROM 411 has a printing control section 411*a* which stores a program for printing control processing (to be described later), a mask process basic section 411*b* which stores a program for the basic processing portion of mask pattern generation processing (to be described later), mask process generating sections 1 to N (411*c*-1 to 411*c*-N) storing a mask pattern generation program group (to be described later) corresponding to the printing mode designated by the host computer 500, a mask process data section 411*d* which stores control data required for mask pattern generation processing, printing control, and the like, and other processing/data sections 411*e* which store programs and data for other system control operations, engine control operations, and the like.

A random number table (random number array data) is stored in the mask process data section 411*d*. This random number table can be applied to multipass printing of a maximum of 16 passes. More specifically, for example, numerical values from 0 to 15 expressed by 4 bits (0000 (b: binary number) to 1111 (b)) are randomly arranged into a random number array in a 4-bit×64-K (32 Kbytes) area in advance on a personal computer or the like by using a random number generator. Since the same random number generating method as that disclosed in Japanese Patent Laid-Open No. 10-235852 is used, a detailed description thereof will be omitted.

According to Japanese Patent Laid-Open No. 10-235852, a random number array is dynamically generated by a printing apparatus. In this embodiment, however, random number array data is stored in the ROM 411 in advance in order to minimize the processing time for mask pattern generation and suppress an increase in cost. If, for example, the performance of the CPU 402 is sufficiently high, random numbers may be generated by other means, e.g., using a random number generation function or adding a random number generating circuit or the like.

The SRAM 430 has a mask process work area 430*a* for high-speed processing in mask pattern generation processing, a mask process area 430*b* in which a mask pattern generation program corresponding to a printing mode is dynamically loaded and executed, and other processing/work areas 430*c* in which control programs and data for control operations that attach importance to real-time performance, e.g., carriage motor control, are stored.

By using the SRAM 430 in this manner, a great increase in processing speed can be expected in an arrangement using a RISC (Reduced Instruction Set of Computer) type CPU, in particular. Recently, as a RISC type CPU, an inexpensive CPU incorporating an SRAM is available. In many cases, therefore, the use of a CPU with an SRAM does not cause an increase in cost.

[Arrangement of Mask Process Data]

In this embodiment, mask numbers are defined, which indicate the types of mask patterns used to perform multipass printout operation so as to obtain desired print quality in accordance with the printing mode (printing medium type, print quality, monochrome/color printing) designated by the host computer 500.

In printing control (to be described later), mask numbers are made to correspond to the types of printing modes, and a desired mask pattern is generated by supplying a corresponding mask number to a mask process generating unit (to be described later). That is, a mask pattern is generated by looking up a control table (to be described below) on the basis of the mask number, and mask pattern information required for printing control is output.

Figure 6:
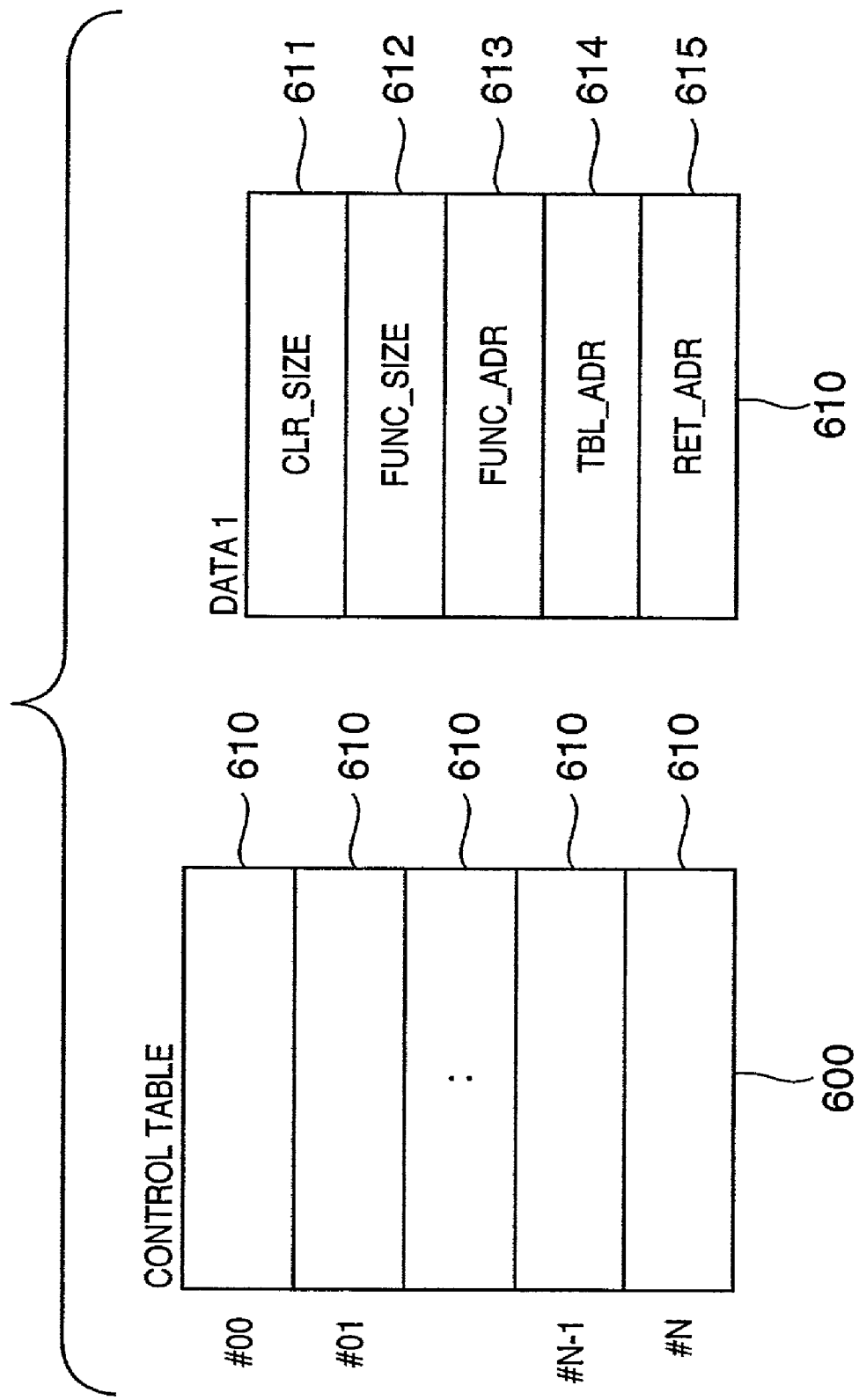
FIG. 6 is a view showing the arrangement of a control table for mask pattern generation according to the embodiment of the present invention.
Figure 7:
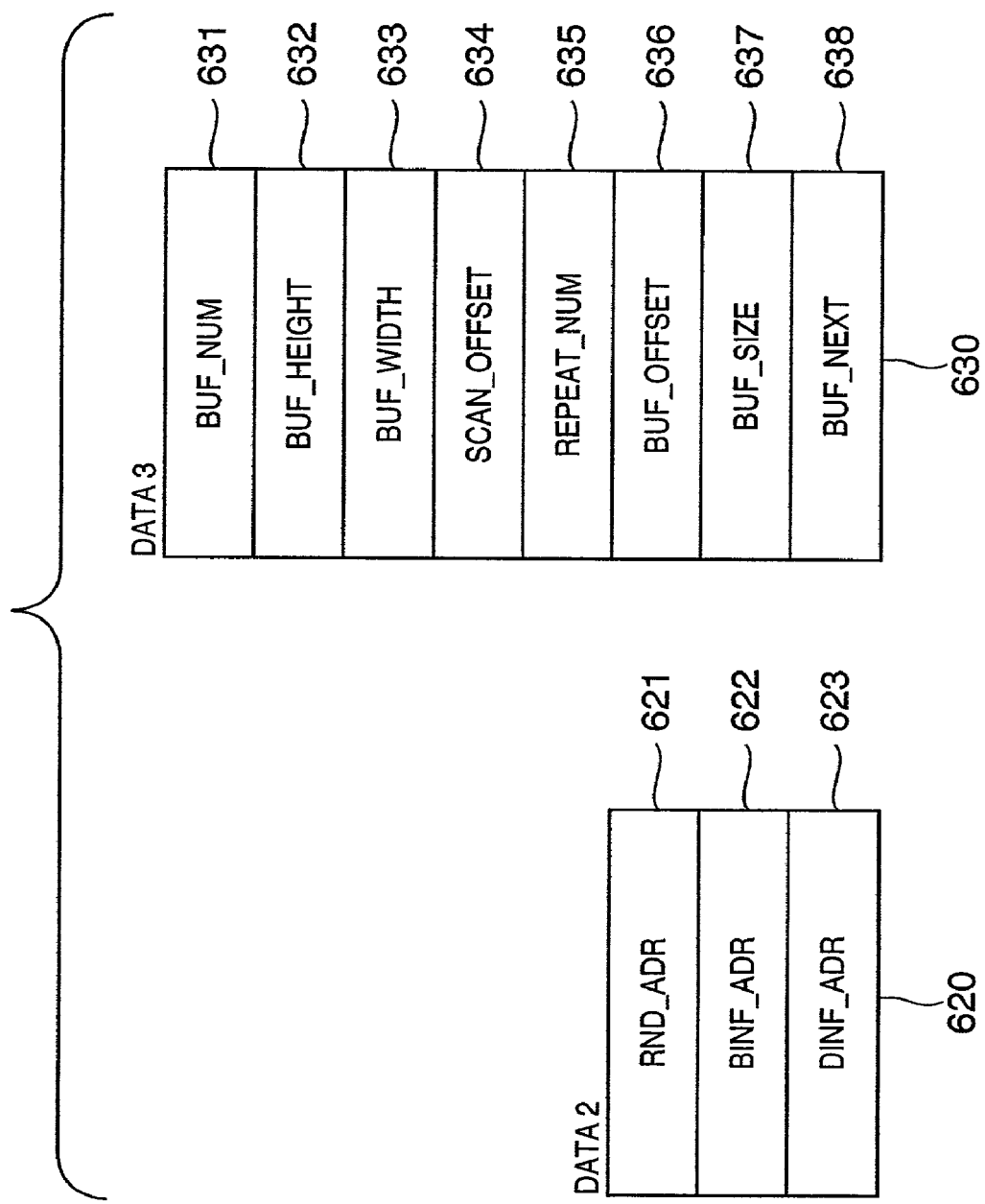
FIG. 7 is a view showing the arrangement of basic information for mask pattern generation according to the embodiment of the present invention.
Figure 8:
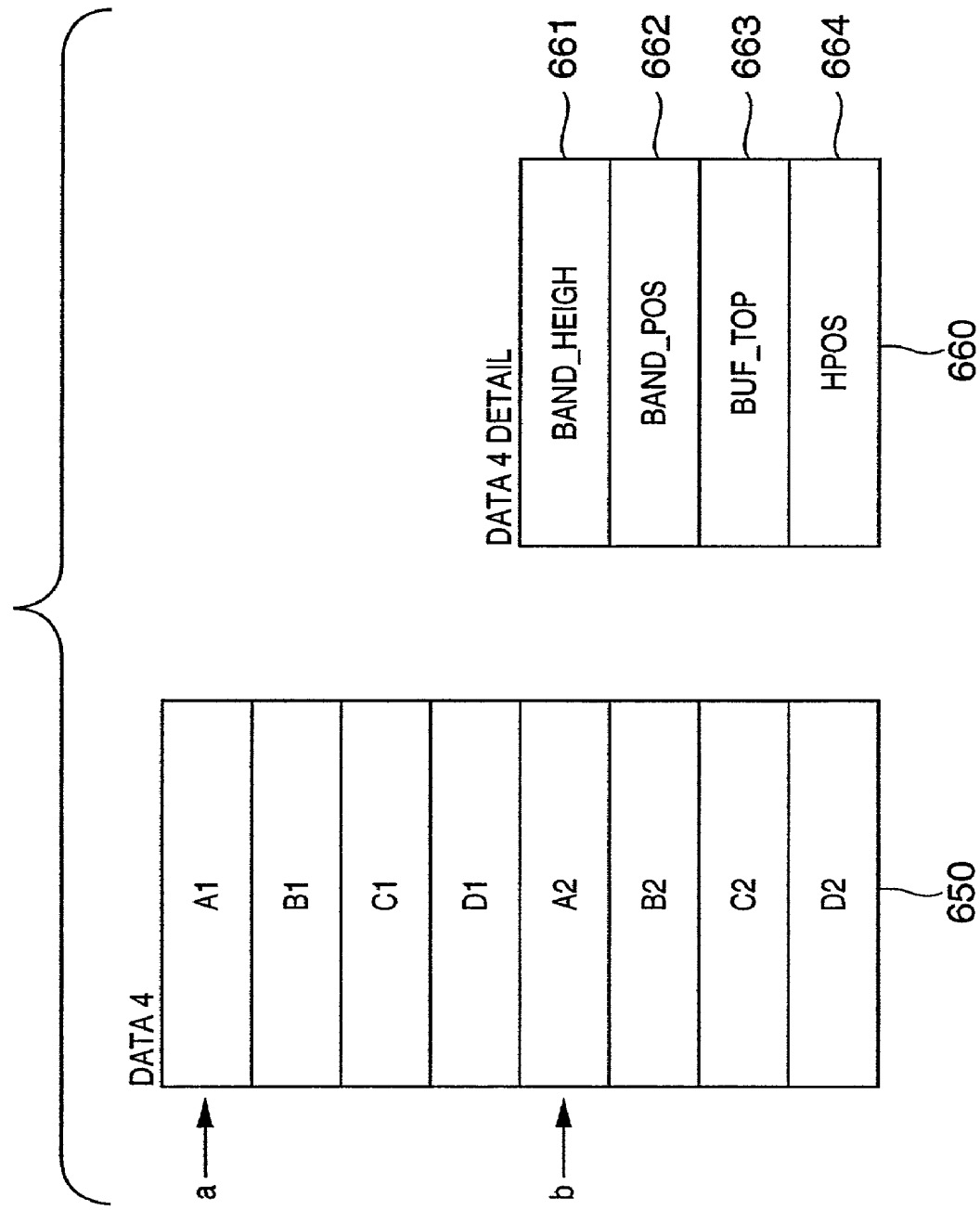
FIG. 8 is a view showing the arrangement of detailed information for mask pattern generation according to the embodiment of the present invention.

FIGS. 6 to 8 show the arrangements of control data stored in the mask process data section 411*d* described with reference to FIG. 5.

In this embodiment, such control data are stored in the ROM 411. However, the data may be stored in another memory such as the RAM 403. The parameters to be described below may be stored in an arbitrary order in an arbitrary arrangement.

In a control table 600 in FIG. 6, first control data 1 (610) corresponding to mask numbers (#00 to #N) are arranged in the mask number order. The first control data 1 (610) is comprised of a field CLR_SIZE 611 for storing a byte count as the total amount of mask pattern data corresponding to the mask number, a field FUNC_SIZE 612 for storing the byte count of a mask pattern generation program corresponding to the mask number, a field FUNC_ADR 613 for storing the storage address of the mask pattern generation program on the ROM 411, a field TBL_ADR 614 for storing the storage address of second control data (data 2 (620) in FIG. 7) corresponding to the mask number, and a field RET_ADR 615 for storing the storage address of basic mask information (data 3 (630) in FIG. 7) corresponding to the mask number.

Second control data 2 (620) in FIG. 7 is comprised of a field RND_ADR 621 for storing the storage address of a random number table, a field BINF_ADR 622 for storing the storage address of data 3 (630) as basic mask information, and a field DINF_ADR 623 for storing the storage address of data 4 (650) as detailed mask information.

In this embodiment, the field RND_ADR 621 is set to allow the read start address of the random number table to be changed in accordance with the type of mask pattern. If, however, another random number generating means such as a random number generator or random number function is to be used, this field is not required.

The data (630) as basic mask information is comprised of a field BUF_NUM 631 for storing the number of mask buffer planes, a field BUF_HEIGHT 632 for storing the number of bytes corresponding to the height of one column of the mask buffer, a field BUF_WIDTH 633 for storing the number of columns (width) of one mask buffer plane, a field SCAN_OFFSET 634 for storing the number of read start offset columns of the mask buffer which are advanced for each printing pass, a field REPEAT_NUM 635 for storing the number of times of repetitive use per mask buffer plane, a field BUF_OFFSET 636 for storing the start offset address of the mask buffer viewed from the mask data storage start address (the address designated in a field MSK_TOP to be described later), a field BUF_SIZE 637 for storing the number of bytes of one mask buffer plane, and a field BUF_NEXT 638 for storing the value obtained by expressing the offset amount between mask buffer planes in bytes when the mask buffer is constituted by a plurality of planes.

In this embodiment, the field BUF_SIZE 637 is set to store a value equal to the product of BUF_HEIGHT 632 and BUF_WIDTH 633 in order to maximize the processing speed in calculating the size of one mask buffer plane. If, however, the processing speed is sufficiently high, this field not required. In addition, if one or all of the values of BUF_NUM 631 to BUF_NEXT 638 are fixed regardless of the mask number, these parameters need not be stored. One or all of the parameters can be easily changed into constants.

Data 4 (650) as detailed mask information in FIG. 8 is made to correspond to the number of interpolation dots in one pass (one band) corresponding to the designated pass count. With a plurality of data 4 (650) as detailed mask information and data 3 (630), various mask patterns can be generated.

In this embodiment, a plurality of mask patterns can be generated. For example, a plurality of mask patterns, e.g., a 1-pass zigzag thinning-out (50% duty) mask pattern, 2-pass mask pattern, 3-pass mask pattern, 4-pass mask pattern, 6-pass mask pattern, 8-pass mask pattern, 12-pass mask pattern, and 16-pass mask pattern, can be generated in accordance with the printing modes.

Mask patterns, mask buffers, and a method of using the mask patterns will be described below prior to a detailed description of data 4 (660).

FIGS. 8 to 11 explain 4-pass printing, i.e., an embodiment of printing based on 4-dot interpolation, in which two different numbers of interpolation dots in the sub-scanning direction are prepared to print by alternating the prepared numbers so as to perform multipass printing by alternating mask patterns on two different planes in order to reduce density irregularity and streaks in the sub-scanning direction.

Figure 9A:
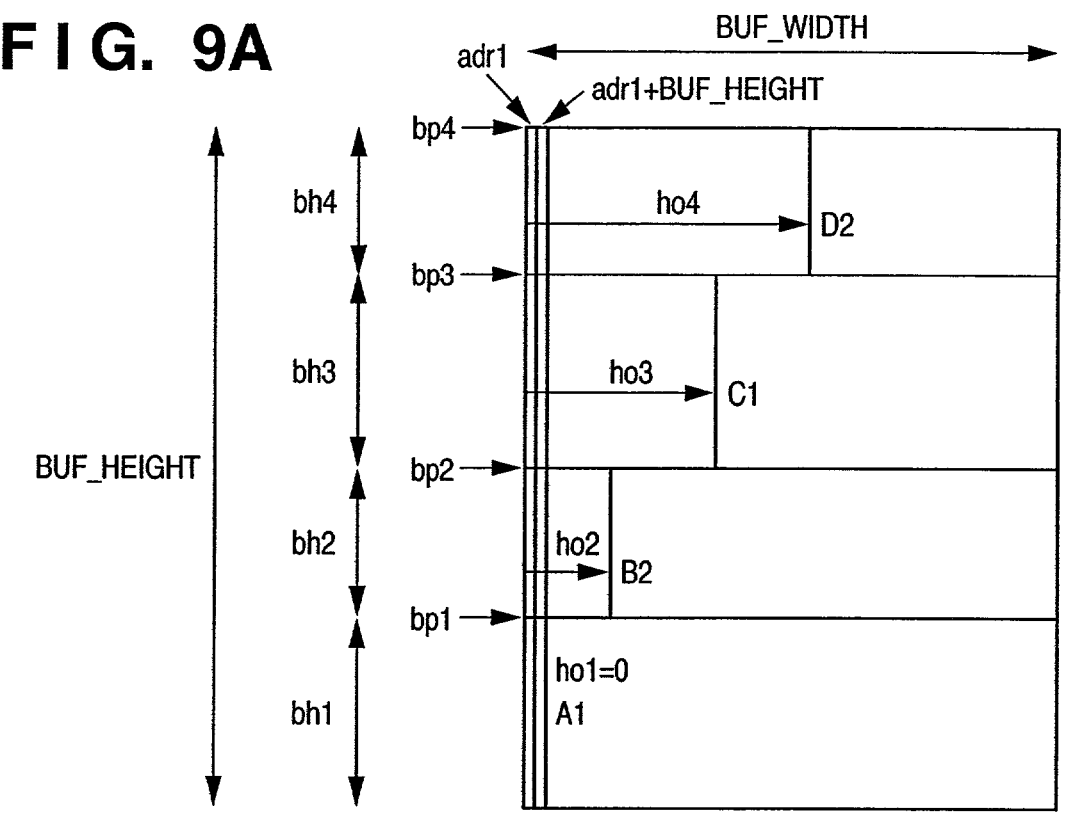
FIG. 9A is a view showing the arrangement of the first mask buffer according to the embodiment of the present invention.

The first mask pattern on the first plane is formed from a mask buffer in the form shown in FIG. 9A. The second mask pattern on the second plane is formed from a mask buffer in the form shown in FIG. 9B. Each mask buffer is formed as an area in which the number of columns corresponding to a necessary width are ensured such that the amount obtained by converting the number of printing elements (the number of dots) of the printhead 104, used for printing, in the sub-scanning direction into the number of bits is considered as a mask pattern amount corresponding to one column.

In this embodiment, since the printhead 104 having 128 nozzles is used, two mask buffer areas are prepared, each of which is constituted by 896 columns each constituted by 16 bytes (128 bits). In the respective mask buffers, bits are sequentially assigned from the above in FIGS. 9A and 9B in the order of bit positions D0, D1, . . . , D15, starting from adr1 and adr2, respectively. The respective bits sequentially correspond to the nozzle numbers of the printhead 104, from nozzle number 0 to nozzle number 127, downward in FIGS. 9A and 9B. Multipass printing is performed by combining these mask patterns in the manners shown in FIGS. 10 and 11.

Figure 10:
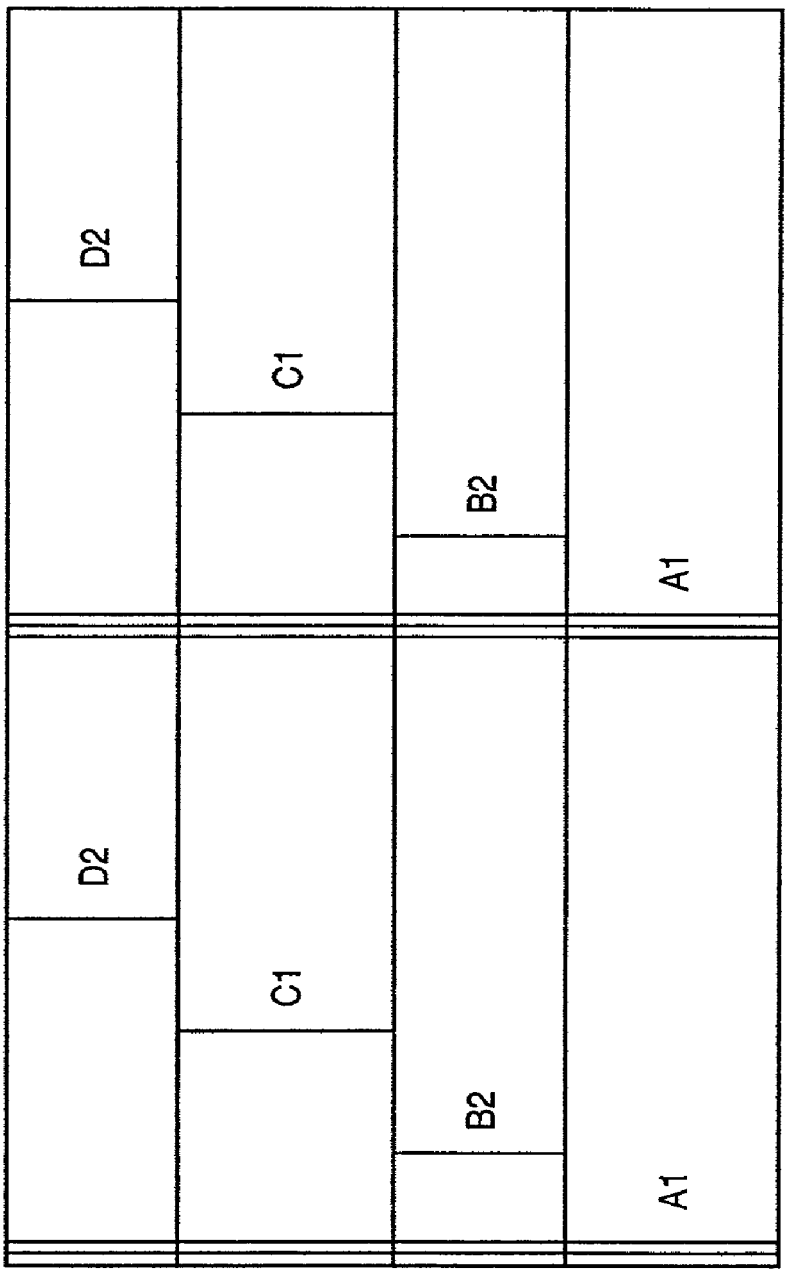
FIG. 10 is a view showing the relationship between a mask buffer and a printing range in printing operation according to the embodiment of the present invention.
Figure 11:
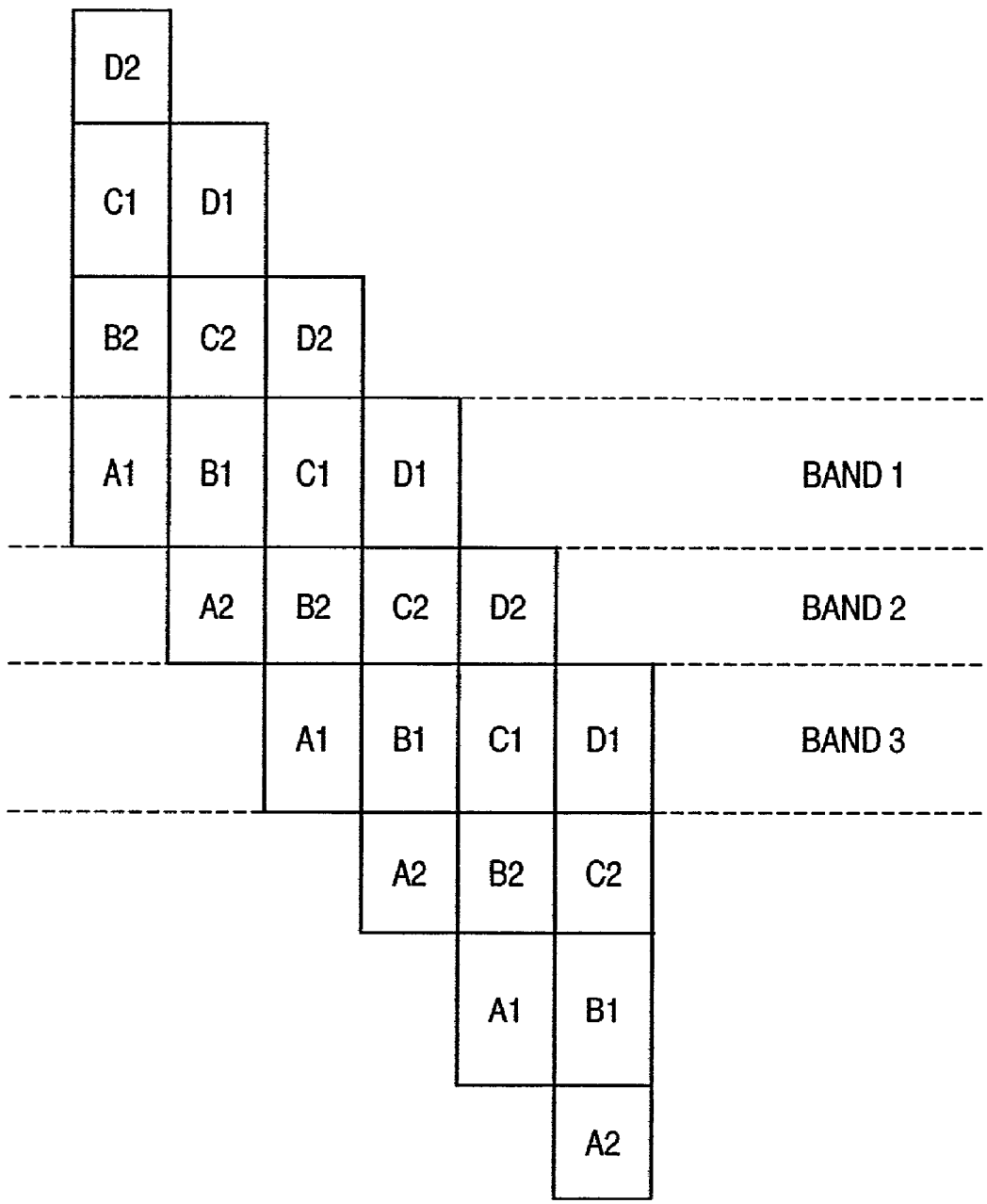
FIG. 11 is a view for explaining a multipass printing method according to the embodiment of the present invention.

First of all, in printing the first pass in band 1 in FIG. 11, a printing medium is conveyed by the height of a portion A1, and an image is printed while it is thinned out by using the first mask pattern in FIG. 9A. FIG. 10 conceptually shows the relationship between the first mask pattern and the main scanning direction. More specifically, the first 0th column of the first mask pattern is made to correspond to the printing start position (e.g., the left printing limit position) of the apparatus. After the last column of the mask pattern, the mask pattern corresponding to the 0th column of the same mask buffer is read out again. In this manner, the mask patterns are made to correspond to each other in the form of a ring in the column direction (main scanning direction).

When the main scanning direction in printing operation coincides with the forward direction (the printhead moves from left to right), settings are made to read out mask pattern data in the forward direction (from left to right in FIG. 11) from a position corresponding to the number of columns corresponding to the remainder of the quotient obtained by dividing the column address of the left dot discharging position by mask pattern width BUF_WIDTH. When the main scanning direction coincides with the reverse direction (from right to left), settings are made to read out mask pattern data in the reverse direction (from right to left in FIG. 11) from a position corresponding to the number of columns corresponding to the remainder of the quotient obtained by dividing the column address of a right dot discharging position by mask pattern width BUF_WIDTH.

Figure 9B:
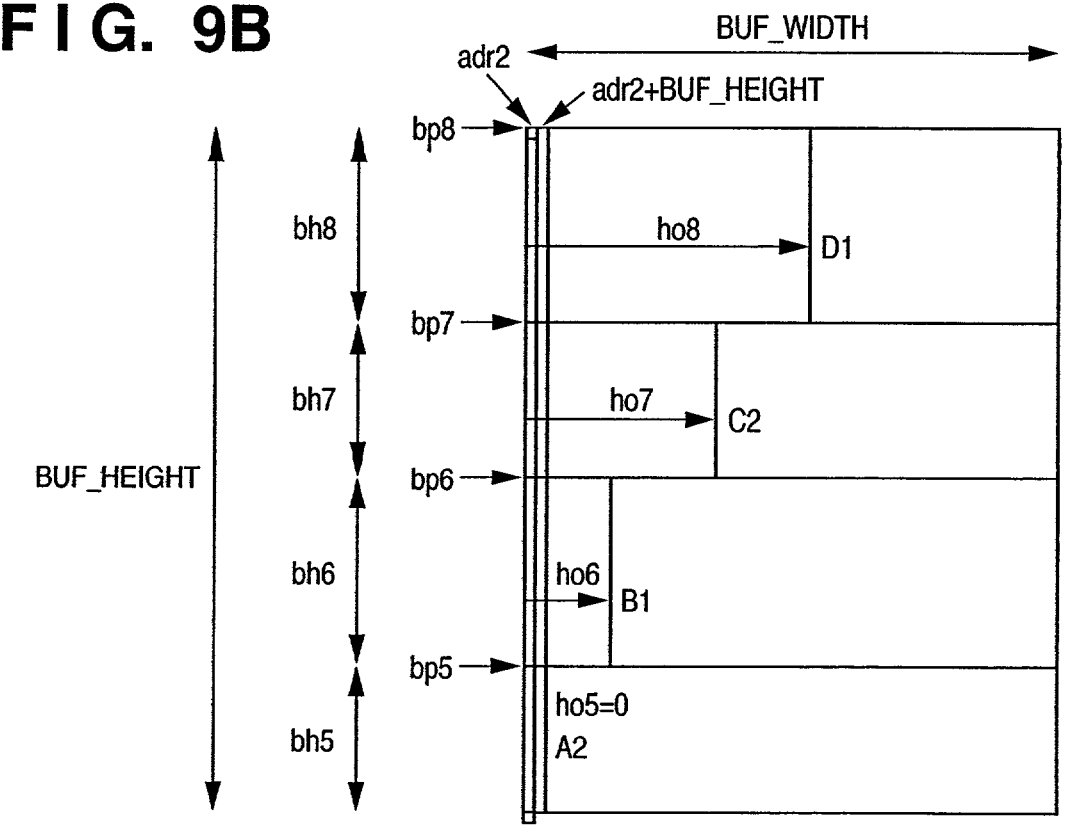
FIG. 9B is a view showing the arrangement of the second mask buffer according to the embodiment of the present invention.

When "first pass in band 1" is completely printed, the printing medium is conveyed by the height of a portion A2 in FIG. 11, and an image is printed while it is thinned out by using the second mask pattern in FIG. 9B, thereby printing "second pass in band 1" and "first pass in band 2". In this case, if the main scanning direction in printing operation coincides with the forward direction (the printhead moves from left to right), the read column position of mask pattern data is set such that the mask pattern data is read out in the forward direction (from left to right in FIG. 11) from a position corresponding to the number of columns corresponding to the remainder of the quotient obtained by dividing the sum of the column address of the left dot discharging position and offset amount SCAN_OFFSET by mask pattern width BUF_WIDTH.

If the main scanning direction coincides with the reverse direction (from right to left), the read column position of mask pattern data is set such that the mask pattern data is read in the reverse direction (from right to left in FIG. 11) from a position corresponding to the number of columns corresponding to the remainder of the quotient obtained by dividing the sum of the column address of the right dot discharging position and offset amount SCAN_OFFSET by mask pattern width BUF_WIDTH.

When "second pass in band 1" and "first pass in band 2" are completely printed, the printing medium is conveyed by the height of the portion A1 in FIG. 11, and an image is printed while it is thinned out by using the first mask pattern in FIG. 9A, thereby printing "third pass in band 1", "second pass in band 2", and "first pass in band 3". In this case, if the main scanning direction in printing operation coincides with the forward direction (the printhead moves from left to right), the read column position of mask pattern data is set such that the mask pattern data is read out in the forward direction (from left to right in FIG. 11) from a position corresponding to the number of columns corresponding to the remainder of the quotient obtained by dividing the sum of the column address of a left dot discharging position and two-fold offset amount SCAN_OFFSET 634 by mask pattern width BUF_WIDTH.

If the main scanning direction coincides with the reverse direction (from right to left), the read column position of mask pattern data is set such that the mask pattern data is read in the reverse direction (from right to left in FIG. 11) from a position corresponding to the number of columns corresponding to the remainder of the quotient obtained by dividing the sum of the column address of the right dot discharging position and two-fold offset amount SCAN_OFFSET 634 by mask pattern width BUF_WIDTH.

When "third pass in band 1", "second pass in band 2", and "first pass in band 3" are completely printed, the printing medium is conveyed by the height of the portion A2 in FIG. 11, and an image is printed while it is thinned out by using the second mask pattern in FIG. 9B, thereby printing "fourth pass in band 1", "third pass in band 2", "second pass in band 3", and "first pass in band following band 3".

In this case, if the main scanning direction in printing operation coincides with the forward direction (the printhead moves from left to right), the read column position of mask pattern data is set such that the mask pattern data is read out in the forward direction (from left to right in FIG. 11) from a position corresponding to the number of columns corresponding to the remainder of the quotient obtained by dividing the sum of the column address of a left dot discharging position and three-fold offset amount SCAN_OFFSET 634 by mask pattern width BUF_WIDTH.

If the main scanning direction coincides with the reverse direction (from right to left), the read column position of mask pattern data is set such that the mask pattern data is read in the reverse direction (from right to left in FIG. 11) from a position corresponding to the number of columns corresponding to the remainder of the quotient obtained by dividing the sum of the column address of the right dot discharging position and three-fold offset amount SCAN_OFFSET 634 by mask pattern width BUF_WIDTH.

In the above manner, the mask patterns are switched for each main scanning operation. In addition, a mask pattern read position is obtained from a position corresponding to the number of columns corresponding to the remainder of the quotient obtained by dividing the sum of the column address and the product of offset amount SCAN_OFFSET 634 and "pass count—1" by the mask pattern width BUF_WIDTH, and printing is repeated, thereby outputting a desired image with predetermined print quality.

By changing the read column position of a mask pattern for each main scanning operation in this manner, the mask pattern at the same column position in the sub-scanning direction is changed in different main scanning operations. This makes it possible to prevent a deterioration in print quality due to inter-pattern tuning in the sub-scanning direction.

The relationship between the mask patterns described above and data 4 (450) and data 4 detail (660) which are the detailed mask information in FIG. 8 will be described below.

As the data 4 (650) as detailed mask information, pieces of information such as the position information of a mask pattern to be generated and information about interpolation relationship are stored in the order of mask pattern generation. For example, as shown in FIG. 11, parameters are stored in the order of mask pattern complementary areas A1, B1, C1, and D1 and complementary areas A2, B2, C2, and D2. These areas A1 to D2 respectively hold the parameters indicated by the data 4 detail (660).

As the parameters in the area A1, bit height bh1 of the portion A1 in FIG. 9A is stored in BAND_HEIGHT 661; mask pattern generation start position bp1, in BAND_POS 662; first mask buffer start position adr1, in BUF_TOP 663; and offset amount ho1 (0: "zero value") in the column direction, in HPOS 664.

As the parameters in the area B1, bit height bh6 of the portion B1 in FIG. 9B is stored in BAND_HEIGHT 661; mask pattern generation start position bp6, in BAND_POS 662; second mask buffer start position adr2, in BUF_TOP 663; and offset amount ho6 (the value of offset amount SCAN_OFFSET 634) in the column direction, in HPOS 664.

As the parameters in the area C1, bit height bh3 of the portion C1 in FIG. 9A is stored in BAND_HEIGHT 661; mask pattern generation start position bp3, in BAND_POS 662; first mask buffer start position adr1, in BUF_TOP 663; and offset amount ho3 (two-fold the value of offset amount SCAN_OFFSET 634) in the column direction, in HPOS 664.

As the parameters in the area D1, bit height bh8 of the portion D1 in FIG. 9B is stored in BAND_HEIGHT 661; mask pattern generation start position bp8, in BAND_POS 662; second mask buffer start position adr2, in BUF_TOP 663; and offset amount ho8 (three-fold the value of offset amount SCAN_OFFSET 634) in the column direction, in HPOS 664.

Likewise, as the parameters in the area A2, bit height bh5 is stored in BAND_HEIGHT 661; mask pattern generation start position bp5, in BAND_POS 662; second mask buffer start position adr2, in BUF_TOP 663; and offset amount ho5 in the column direction, in HPOS 664.

As the parameters in the area B2, bit height bh2 is stored in BAND_HEIGHT 661; mask pattern generation start position bp2, in BAND_POS 662; first mask buffer start position adr1, in BUF_TOP 663; and offset amount ho2 (the value of offset amount SCAN_OFFSET 634) in the column direction, in HPOS 664.

As the parameters in the area C2, bit height bh7 is stored in BAND_HEIGHT 661; mask pattern generation start position bp7, in BAND_POS 662; second mask buffer start position adr2, in BUF_TOP 663; and offset amount ho7 (two-fold the value of offset amount SCAN_OFFSET 634) in the column direction, in HPOS 664.

As the parameters in the area D2, bit height bh4 is stored in BAND_HEIGHT 661; mask pattern generation start position bp4, in BAND_POS 662; first mask buffer start position adr1, in BUF_TOP 663; and offset amount ho4 (three-fold the value of offset amount SCAN_OFFSET 634) in the column direction, in HPOS 664.

Note that bit heights bh1, bh6, bh3, and bh8 of the mask patterns are the same value, and bit heights bh5, bh2, bh7, and bh4 are the same value. In this embodiment, as described above, the number of printing elements per color in the sub-scanning direction is 128, the arrangement resolution is 600 dpi, and the driving resolution of the convey system is 400 dpi. In order to perform 4-pass printing with 600 dpi in the sub-scanning direction, the number of dots of each complementary pattern needs to be 3n. For this reason, the former bit height is set to 33 bits, and the latter bit height is set to 27 bits.

[Mask Pattern Generating Method]

A mask pattern generating method according to this embodiment will be described next with reference to FIGS. 12A and 12B.

In the following description, for the sake of descriptive convenience, a method of generating a mask pattern constituted by four columns, each consisting of three bits, and four planes (3 bits×4 bits×4 planes) will be exemplified. Obviously, however, other mask patterns such as a mask pattern of N bits×M bits×L planes can also be generated.

Figure 12A:
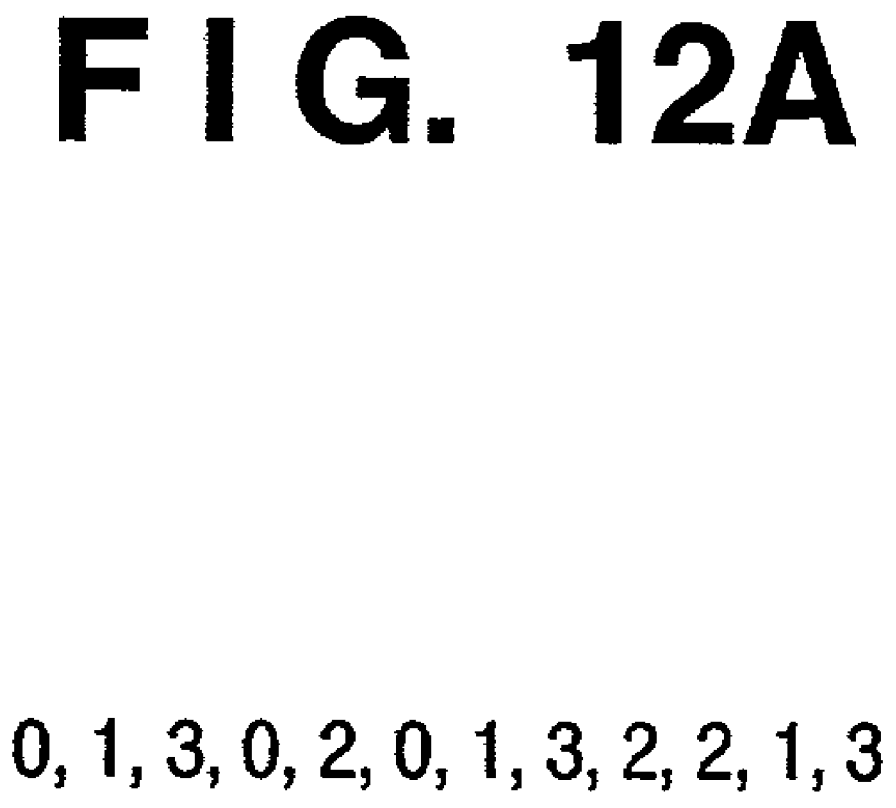

The sequence shown in FIG. 12A represents 12 random number array data for generating a 12-bit, 4-plane interpolation mask pattern. In order to perform 4-plane interpolation, i.e., 4-dot interpolation, at least four random numbers may be randomly generated, and any one of the bits of the four planes may be set to 1 according to the generated random numbers.

Assume that four random numbers of 0 to 3 are randomly generated. In this case, for 0, the target bit of a first plane pattern PT1 is set to 1; for 1, the target bit of a second plane pattern PT2 is set to 1; for 2, the target bit of a third plane pattern PT3 is set to 1; and for 3, the target bit of a fourth plane pattern PT4 is set to 1.

Figure 12B:
FIG. 12B is a view showing an example of the mask pattern generating method according to this embodiment.

FIG. 12B shows mask patterns generated on the basis of the random number array data in FIG. 12A by using this method. Referring to FIG. 12B, reference symbols A to D on the upper side denote column numbers, and reference numerals 1 to 3 on the left side denote row numbers. In the following description, the first bit of column A of an nth pattern PTn is expressed as PTn[A, 1] for the sake of convenience.

First of all, all the bits of the patterns PT1 to PT4 are cleared to 0 in advance. Since the first random number is 0, PT1[A, 1] is set to 1. Since the next random number is 1, PT2[A, 2] is set to 1. Since the next random number is 3, PT4[A, 3] is set to 1.

Since the next random number is 0, PT1[B, 1] is set to 1. Since the next random number 2, PT3[B, 2] is set to 1. Since the next random number 0, PT1[B, 3] is set to 1.

Since the next random number is 1, PT2[C, 1] is set to 1. Since the next random number 3, PT4[C, 2] is set to 1. Since the next random number 2, PT3[C, 3] is set to 1.

Since the next random number is 2, PT3[D, 1] is set to 1. Since the next random number 1, PT2[D, 2] is set to 1. Since the last random number 3, PT4[D, 3] is set to 1.

In the above manner, mask pattern generation is completed.

[Adjacent Dot Inhibition Control Method for Mask Pattern]

The printhead 104 in this embodiment can print in the main scanning direction at a print resolution of 1,200 dpi. In addition, the printhead 104 can be moved in the main scanning direction at a scanning speed of 25 inches/sec.

Under this condition, the driving frequency of each printing element of the printhead 104 needs to be about 30 kHz (=1/(1/25/1200)) at maximum. It is technically difficult to increase the maximum driving frequency of printing elements. Even if the frequency can be increased, the characteristics of parts and the like must be managed with high precision, resulting in an increase in cost. In such a case, therefore, each printing element must be driven discontinuously by zigzag thinning-out operation or the like.

Assume that the print resolution in the main scanning direction is 1,200 dpi. In this case, if a mask pattern like the mask pattern PT1 with PT1[A, 1] and PT1[B, 1] in FIG. 12A is used, a printing element is continuously driven. If the print resolution is 600 dpi or the above scanning speed is ½, no problem arises. The use of such a method, however, causes a deterioration in print quality or a decrease in printout speed.

Under the circumstance, as shown in FIG. 12D, the mask pattern shown in FIG. 12B is corrected by an adjacent dot inhibit computation like that shown in FIG. 12C, thereby generating a mask pattern that causes each printing element to be always driven discontinuously. This makes it possible to form a high-quality image at a scanning speed of 25 inches/sec and 1,200 dpi.

Note that an adjacent dot inhibition computation other than that shown in FIG. 12C can be done during generation of a mask pattern. For example, every time a mask bit is to be set to 1, it is checked whether the immediately preceding adjacent bit is 0. If the adjacent bit is 1, the bit can be set according to another pattern. If, however, such bit determination and bit operation are done, it takes much time to generate a mask pattern.

In this embodiment, therefore, using the adjacent dot inhibition computation shown in FIG. 12C, a mask pattern is generated in the same computation time to inhibit printing adjacent dots corresponding to adjacent bits in columns. Referring to FIG. 12C, each numeral enclosed with ( ) indicates a mathematical expression and its ordinal number in computation, and each underlined character represents an operator. "AND" represents a logical product; "OR", a logical sum; and "EOR", an exclusive logical sum. In addition, "WK" represents a general-purpose work area or work register.

(For Column A)

If a pattern generation target column is the first column, i.e., column A in this case, an adjacent dot inhibition computation is performed by the following procedure. First of all, 3-bit patterns in columns A of the respective patterns PT1 to PT4 are respectively generated in the work registers by a procedure similar to that described with reference to FIG. 12A, thereby (1) storing the pattern for PT1 in a first column pattern storage area (or register) PT1s, (2) storing the pattern for PT1 in an adjacent column pattern storage area (or register) PT1p, (3) storing the pattern for PT2 in a first column pattern storage area (or register) PT2s, (4) storing the pattern for PT2 in an adjacent column pattern storage area (or register) PT2p, (5) storing the pattern for PT3 in a first column pattern storage area (or register) PT3s, (6) storing the pattern for PT3 in an adjacent column pattern storage area (or register) PT3p, (7) storing the pattern for PT4 in a first column pattern storage area (or register) PT4s, (8) storing the pattern for PT4 in an adjacent column pattern storage area (or register) PT4p, and finally writing the respective column patterns in columns A of PT1 to PT4.

(For Columns B and C)

If a pattern generation target column is neither the first column nor the last column, i.e., column B or C in this case, an adjacent dot inhibition computation is performed by the following procedure. First of all, 3-bit patterns in columns B of the respective patterns PT1 to PT4 are respectively generated in the work registers by a procedure similar to that described with reference to FIG. 12A, thereby (1) storing the logical product of the pattern for PT1 and the adjacent column pattern PT1p in WK, (2) updating the pattern for PT1 to the exclusive logical sum computation result on WK to change PT1'[B, 1] in FIG. 12D from 1 to 0, (3) updating the pattern for PT2 to the logical sum computation result on WK to change PT1' [B, 1] in FIG. 12D from 0 to 1, (4) storing the logical product of the pattern for PT2 and the adjacent column pattern PT2$p$ in WK, (5) updating the pattern for PT2 to the exclusive logical sum computation result on WK, (6) updating the pattern for PT3 to the logical sum computation result on WK, (7) storing the logical product of the pattern for PT3 and the adjacent column pattern PT3$p$ in WK, (8) updating the pattern for PT3 to the exclusive logical sum computation result on WK, (9) updating the pattern for PT4 to the logical sum computation result on WK,

(10) storing the logical product of the pattern for PT4 and the adjacent column pattern PT4$p$ in WK,

(11) updating the pattern for PT4 to the exclusive logical sum computation result on WK,

(12) updating the pattern for PT1 to the logical sum computation result on WK, and

(13) to (16) storing the patterns for PT1 to PT4 in the adjacent column pattern storage areas (registers) PT1$p$ to PT4$p$, and finally writing the respective column patterns in columns B of PT1 to PT4. C columns are processed in the same manner. In this case, PT2'[c, 1] in FIG. 12D is changed from 1 to 0 in computation (5), and PT3'[C, 1] in FIG. 12D is changed from 0 to 1 in computation (6).

(For Column D)

If a pattern generation target column is the last column, i.e., column D in this case, an adjacent dot inhibition computation is performed by the following procedure. First of all, 3-bit patterns in columns D of the respective patterns PT1 to PT4 are respectively generated in the work registers by a procedure similar to that described with reference to FIG. 12A, thereby (1) storing the logical product of the pattern for PT1 and the logical sum of the adjacent column pattern PT1$p$ and the first column pattern PT1$s$ in WK, (2) updating the pattern for PT1 to the exclusive logical sum computation result on WK, (3) updating the pattern for PT2 to the logical sum computation result on WK, (4) storing the logical product of the pattern for PT2 and the logical sum of the adjacent column pattern PT2$p$ and the first column pattern PT2$s$ in WK, (5) updating the pattern for PT2 to the exclusive logical sum computation result on WK, (6) updating the pattern for PT3 to the logical sum computation result on WK, (7) storing the logical product of the pattern for PT3 and the logical sum of the adjacent column pattern PT3$p$ and the first column pattern PT3$s$ in WK, (8) updating the pattern for PT3 to the exclusive logical sum computation result on WK to change PT3'[D, 1] in FIG. 12D from 1 to 0, (9) updating the pattern for PT4 to the logical sum computation result on WK to change PT4'[D, 1] in FIG. 12D from 0 to 1,

(10) storing the logical product of the pattern for PT4 and the logical sum of the adjacent column pattern PT4$p$ and the first column pattern PT4$s$ in WK,

(11) updating the pattern for PT4 to the logical sum computation result on WK to change PT4' [D, 3] in FIG. 12D from 1 to 0,

(12) updating the pattern for PT1 to the logical sum computation result on WK to change PT1'[D, 3] in FIG. 12D from 0 to 1,

(13) storing the logical product of the pattern for PT1 and the logical sum of the adjacent column pattern PT1$p$ and the first column pattern PT1$s$ in WK,

(14) updating the pattern for PT1 to the exclusive logical sum computation result on WK,

(15) updating the pattern for PT2 to the logical sum computation result on WK,

(16) storing the logical product of the pattern for PT2 and the logical sum of the adjacent column pattern PT2$p$ and the first column pattern PT2$s$ in WK,

(17) updating the pattern for PT2 to the exclusive logical sum computation result on WK, and

(18) updating the pattern for PT3 to the logical sum computation result on WK, and finally writing the respective column patterns in columns D of PT1 to PT4.

In this manner, the pattern in FIG. 12B can be corrected into the one shown in FIG. 12D.

Although this embodiment has exemplified 4-bit interpolation, the above procedure may be changed as follows for 3-bit interpolation.

In a computation for columns A, mathematical expressions (7) and (8) become unnecessary. In a computation for columns B and C, mathematical expressions (9) to (11) and (16) become unnecessary. In a computation for columns D, mathematical expressions (9) to (11) and (16) to (18) become unnecessary.

In addition, for example, 6-bit interpolation can be handled by adding (9) PT5$s$=PT5A, (10) PT5$p$=PT5A, (11) PT6$s$=PT6A, and (12) PT6$p$=PT6A to a computation for columns A; adding (11-2) PT5$n$=PT5$n$ OR WK, (11-3) WK=PT5$n$ AND PT5$p$, (11-4) PT5$n$=PT5$n$ EOR WK, (11-5) PT6$n$=PT6$n$ OR WK, (11-6) WK=PT6$n$ AND PT6$p$, and (11-7) PT6$n$=PT6$n$ EOR WK after (11) in a computation for each of columns B and C, while adding (17) PT5$p$=PT5A, and (18) PT6$p$=PT6A after (16); and adding (11-2) PT5$n$=PT5$n$ OR WK, (11-3) WK=PT5$n$ AND (PT5$p$ OR PT5$s$), (11-4) PT5$n$ =PT5$n$ EOR WK, (11-5) PT6$n$=PT6$n$ OR WK, (11-6) WK=PT6$n$ AND (PT6$p$ OR PT6$s$), and (11-7) PT6$n$=PT6$n$ EOR WK after (11) in a computation for columns D, while adding (19) WK=PT3$n$ AND (PT3$p$ OR PT3$s$), (20) PT3$n$=PT3$n$ EOR WK, (21) PT4$n$=PT4$n$ OR WK, (22) WK=PT4$n$ AND (PT4$p$ OR PT4$s$), (23) PT4$n$=PT4$n$ EOR WK, and (24) PT5$n$=PT5$n$ OR WK after (18). Dot interpolation with a different number of dots can be handled on the basis of the same idea as described above.

[Printing Control Method]

Figure 13:
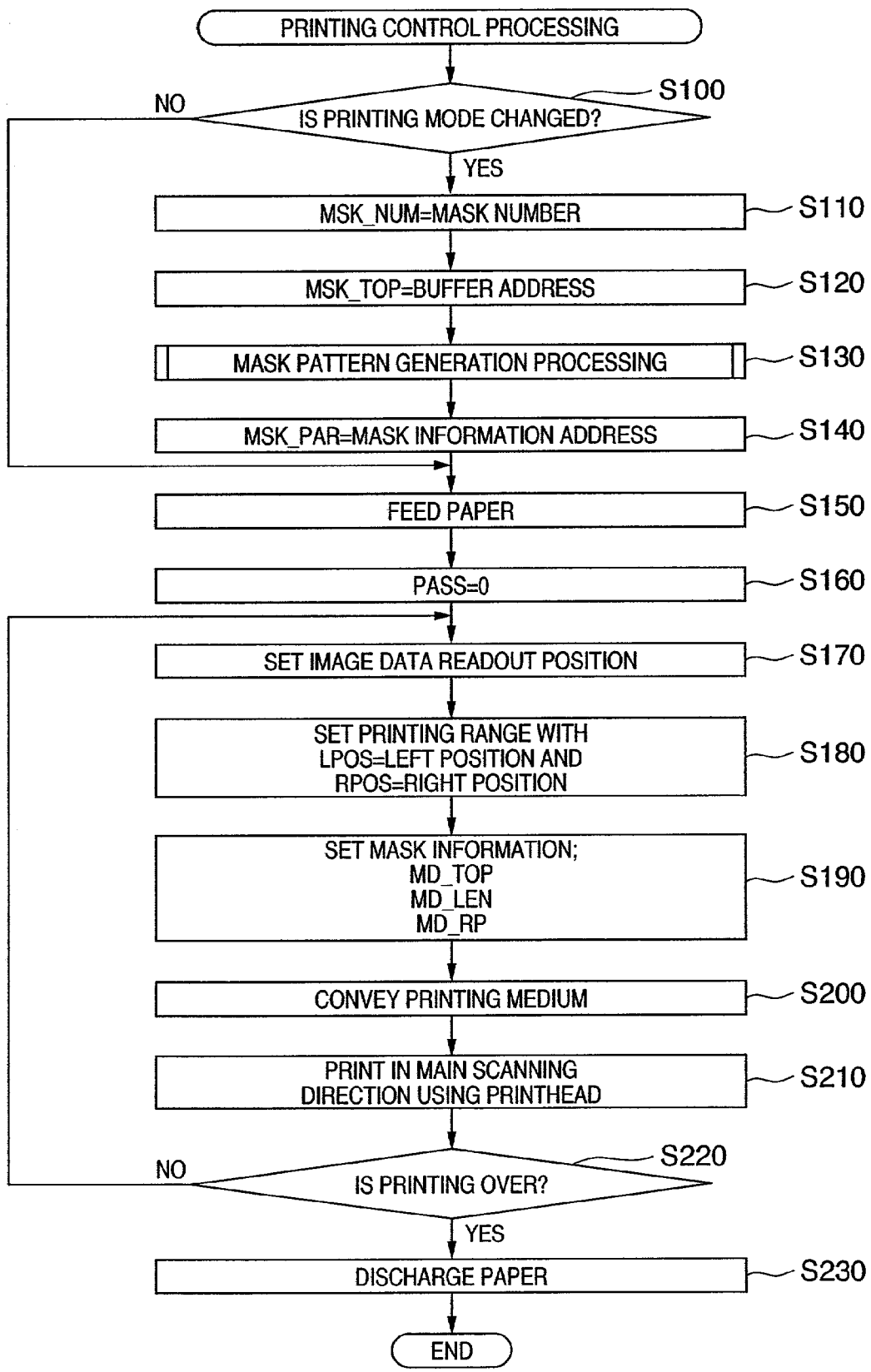
FIG. 13 is a flow chart showing printing control executed by the ink-jet printer according to the embodiment of the present invention.

FIG. 13 is a flow chart showing printing control executed by the ink-jet printer 100 according to the embodiment of the present invention.

Note that the parameters used in FIG. 13 are ensured in the other areas 403$c$ in the RAM 403 described with reference to FIG. 5. Reference symbol MSK_NUM denotes a work register for storing mask numbers; and "MSK_TOP", a work register in which a mask data storage start address is set and which is used to exchange these parameters during mask pattern generation processing.

In addition, reference symbol MSK_PAR denotes a work register for storing the storage address of the basic information (data 3 (630) in FIG. 7) of a mask pattern generated in mask pattern generation processing.

Reference symbols LPOS and RPOS respectively denote work registers for temporarily storing the left and right positions of a print area in each main scanning operation;

and PASS, a work register for counting printing passes. In addition, reference symbols MD_TOP 730, MD_LEN 740, and MD_RP 750 denote control registers for controlling the mask data read control circuit 710 described with reference to FIG. 4.

The processing shown in FIG. 13 is executed at the start of printing.

When an instruction to start printing is issued, it is checked whether the printing mode for the preceding page has changed (step S100). If the printing mode remains the same (NO in step S100), the flow advances to step S150. If the printing mode has changed (YES in step S100), the flow advances to step S110. A mask pattern is generated in steps S110 to S140.

More specifically, a printing scheme is obtained in accordance with an instruction to set a designated printing mode, parameters such as a printing pass count and mask number are prepared, and the mask number is set to MSK_NUM (step S110). A mask data storage start address is then set to MSK_TOP (step S120). Mask pattern generation processing (to be described later) is executed (step S130). Subsequently, the basic information of the mask pattern is stored in MSK_PAR (step S140).

In order to start printing, a printing medium is fed (step S150). If paper feeding operation is normally completed, the flow advances to step S160.

If paper feeding operation fails due to a shortage of printing medium (no paper) or paper jam, the flow waits until a printing medium is normally fed by retry operation or paper re-feeding operation by the user.

When the printing medium is fed and preparations for printing are completed, printing pass count PASS is reset to 0 (step S160). Printing is done by repeatedly executing steps S170 to S220 until it is determined in step S220 that printing is completed.

More specifically, an image data read position is set in order to extract a portion to be printed from the image data area 403a of the RAM 403 by main scanning operation in step S210 (step S170). The left and right positions of the printing area are then stored in LPOS and RPOS, respectively (step S180). Subsequently, by referring to the basic information of the mask pattern acquired in step S140, MD_TOP 730, MD_LEN 740, and MD_RP 750 of the mask data read control circuit 710 are set as follows (step S190).

In the following description, "X+Y" indicates a mathematical expression for adding X and Y; "X*Y", a mathematical expression for multiplying X by Y; "X/Y", a mathematical expression for obtaining a quotient by dividing X by Y; and "X % Y", a mathematical expression for obtaining the remainder of the quotient obtained by dividing X by Y.

①  MD_TOP=MSK_TOP+BUF_OFFSET(636)+ ((PASS/REPEAT_NUM(635)) % BUF_NUM(631)) *BUF_NEXT

② MD_LEN =BUF_SIZE(637)

When the main scanning direction coincides with the forward direction (printing from left to right), ③ MD_RP=((SCAN_OFFSET(636)*PASS+LPOS) % BUF_WIDTH(633))*BUF_HEIGHT(632)

When the main scanning direction coincides with the reverse direction (printing from right to left), ④ MD_RP= ((SCAN_OFFSET(636)*PASS+RPOS) % BUF_WIDTH (633))*BUF_HEIGHT(632)

Then, the printing medium is conveyed in the sub-scanning direction by a required amount, i.e., an amount corresponding to the height of the lowermost band in multipass printing which is to be scanned next (step S200). Printing in the main scanning direction is performed by using the printhead 104 (step S210). In step S220, it is checked whether all the image data to be printed within this page are completely printed. If printing is not completed (NO in step S220), the flow returns to step S170 to continue printing operation. If printing is completed (YES in step S220), the printing medium is discharged (step S230), and the processing is terminated.

[Method of Controlling Mask Pattern Generation Processing]

In general, a definition called word length is used for a memory device, and the number of bits (word length) constituting one memory location is fixed to 8, 16, or 32. For example, as the RAM 403 in this embodiment, a 16-bit memory is used. As described above, according to the present invention, in generating a mask pattern, a pattern with an arbitrary number of bits in the sub-scanning direction is generated from an arbitrary position in the sub-scanning direction so as to become a predetermined interpolation dot pattern, thereby generating a mask pattern.

For this reason, the number of bits of a mask pattern, in the sub-scanning direction, which is to be generated and forms one interpolation relationship is not necessarily 16n. In addition, a start bit position from which the generated mask pattern is to be written in the RAM 403 does not necessarily coincide with 16n.

In this embodiment, therefore, the entire mask data area 403b as a target in the RAM 403 is cleared to 0 in advance, and 32-bit work registers equal in number to mask patterns to be generated are prepared in the SRAM 430. The respective mask patterns in one column as a mask pattern generation target are generated in the prepared work registers, respectively, from the least significant bit (D0 bit) up to 16 bits.

The data obtained by shifting each 32-bit work register to the left (by a maximum of 15 bits) to be located at the write bit position of the corresponding mask pattern is OR (logical sum)—written at a desired position in the RAM 403 such that the lower-16 bit data and upper 16-bit data are separately written.

As described above, since a 32-bit work register that is frequency accessed is set in the SRAM 430 or a general-purpose register of the CPU 402 is used, the processing speed can be increased. In addition, the mask pattern generation processing section is divided into a plurality of sections for the respective types of mask patterns, and these processes are simplified as much as possible to minimize the size of a mask pattern generation program for one process. This program is stored in ROM 411 in advance. Immediately before the execution of mask pattern generation processing corresponding to mask number MSK_NUM, the mask pattern generation program is loaded into the mask data area 403b of the SRAM 430, thus executing the mask pattern generation program on the SRAM 430 and generating a mask pattern at high speed.

If, however, the SRAM 430 has a sufficiently large memory size and allows all kinds of mask pattern generation programs to be statistically resident, a mask pattern generation program need not be loaded into the SRAM for every operation. For example, such a program may be loaded in advance in the SRAM 430 at the timing of the initialization of the apparatus.

In this method, however, since the memory size of the SRAM becomes large, the chip area of a control integrated circuit or the like increases. As a result, the cost increases.

This method is therefore not practical. Another method is conceivable, in which special control logic is prepared, and the above processing is partly or entirely supported by a hardware logic circuit.

For example, writing of a mask pattern in the RAM 403 described above may be supported by the hardware logic circuit, and software processing may be performed to generate the necessary number of bits constituting a mask pattern without being conscious of the memory boundaries, thereby setting the bit pattern data of the mask pattern to be written in a predetermined control register of the prepared hardware logic circuit and its write start bit position.

In addition, only the bit positions of the write target bits of the mask pattern directly generated by the hardware logic circuit in the RAM 403 by the hardware logic circuit using a read modify write technique in accordance with the write instruction issued by software processing can be rewritten.

In such a case, the above zero clearing of the mask buffer need not be performed, and hence a further increase in processing speed can be expected. In addition, the present invention may use a method of generating a mask pattern in accordance with the random numbers generated by the hardware logic circuit or a method of performing the above adjacent dot inhibition computation using the hardware logic circuit.

If the hardware logic circuit is used to generate a mask pattern in this manner, the processing time required to generate the mask pattern can be shortened. In these methods based on support from the hardware logic circuit, however, an increase in cost due to addition of a control circuit and the like may occur. This may make it difficult to make a slight change in specification in a mask pattern generating method.

Mask pattern generation processing in step S130 in FIG. 13 will be described in detail next with reference to FIG. 14.

FIG. 14 is a flow chart showing the details of the mask pattern generation processing in step S130 according to the embodiment of the present invention.

The mask pattern generation processing described with reference to FIG. 14 is realized by a program executed under the control of the CPU 402 but may be realized by a dedicated hardware circuit.

First of all, by looking up the control table 600 in FIG. 6 on the basis of mask number MSK_NUM set in step S110 in FIG. 13, the parameter of data 1 (610) corresponding to the mask number is acquired (step S300). The RAM 403 is then cleared to 0 by the number of bytes designated by parameter CLR_SIZE 611 acquired in step S300 from the address designated by mask data start address MSK_TOP set in step S130 in FIG. 13.

The parameter of data 2 (620) in FIG. 7 which is stored at the address designated by parameter TBL_ADR 614 acquired in step S300 is acquired. Then, read start address RND_ADR 621 in the random number table is stored in a work register RND; storage address BINF_ADR 622 of the data 3 (630) which is the basic mask information in FIG. 7, in a work register BINF; and storage address DINF_ADR 623 of the data 4 (650) which is the detailed mask information in FIG. 8, in a work register DINF (step S320).

A mask pattern generation program is loaded into the mask processing area 430b of the SRAM 430 from the ROM 411 from the address designated by storage address FUNC_ADR 613 for mask pattern generation processing, which is the parameter acquired in step S310, by the number of bytes designated by FUNC_SIZE 612 (step S330). The loaded program is then executed on the SRAM 430 (step S340). In step S320, the storage address of the basic mask information stored in the work register BINF is read out and set as a return value (step S350), thus terminating the processing.

[Method of Generating High-Speed Mask Pattern (Executed on SRAM)]

A specific example of the processing in step S340 in FIG. 14 will be described next with reference to FIGS. 15A and 15B.

Figure 15A:
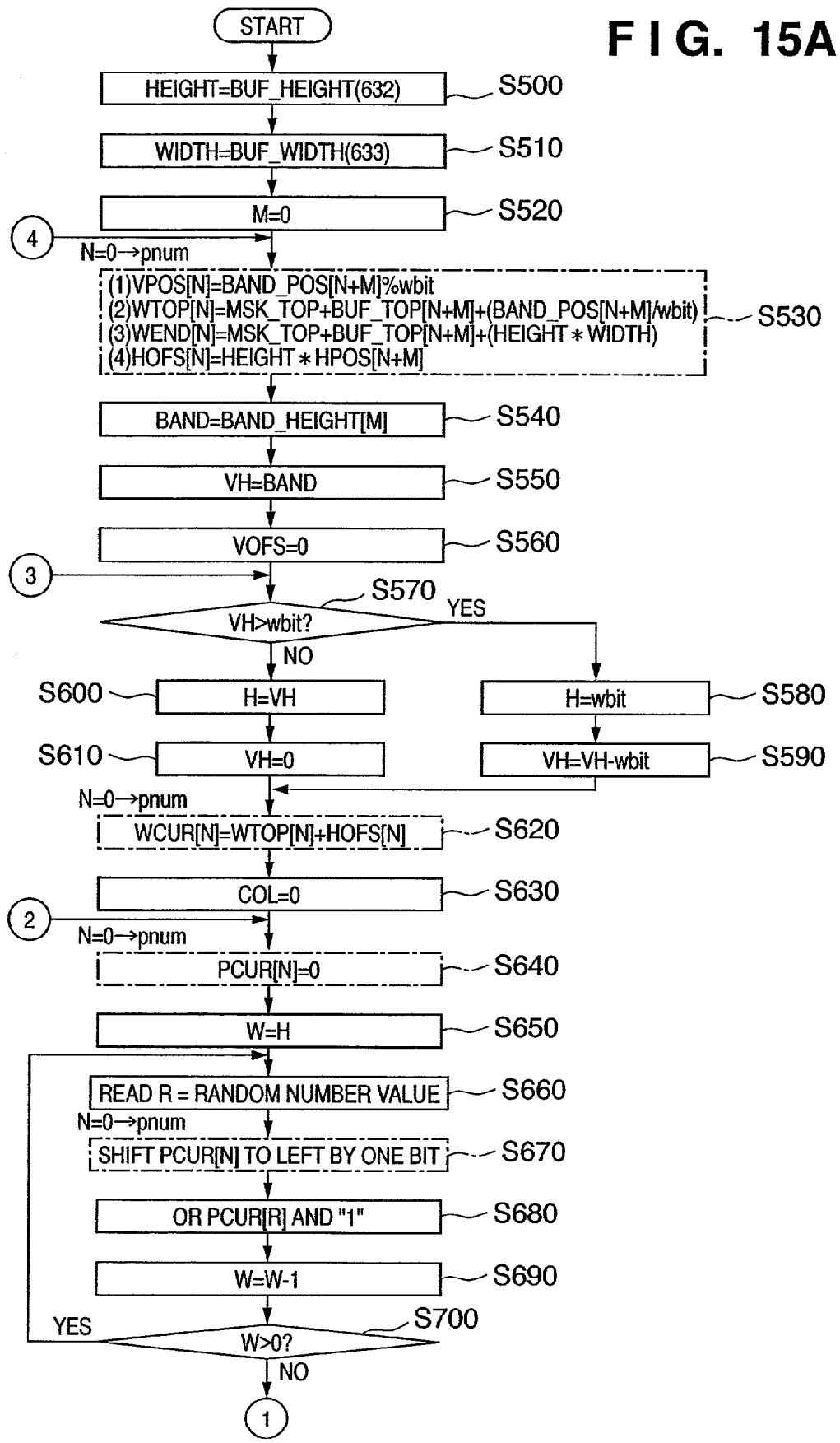
FIG. 15A is a flow chart showing a specific example of mask pattern generation processing according to the embodiment of the present invention.
Figure 15B:
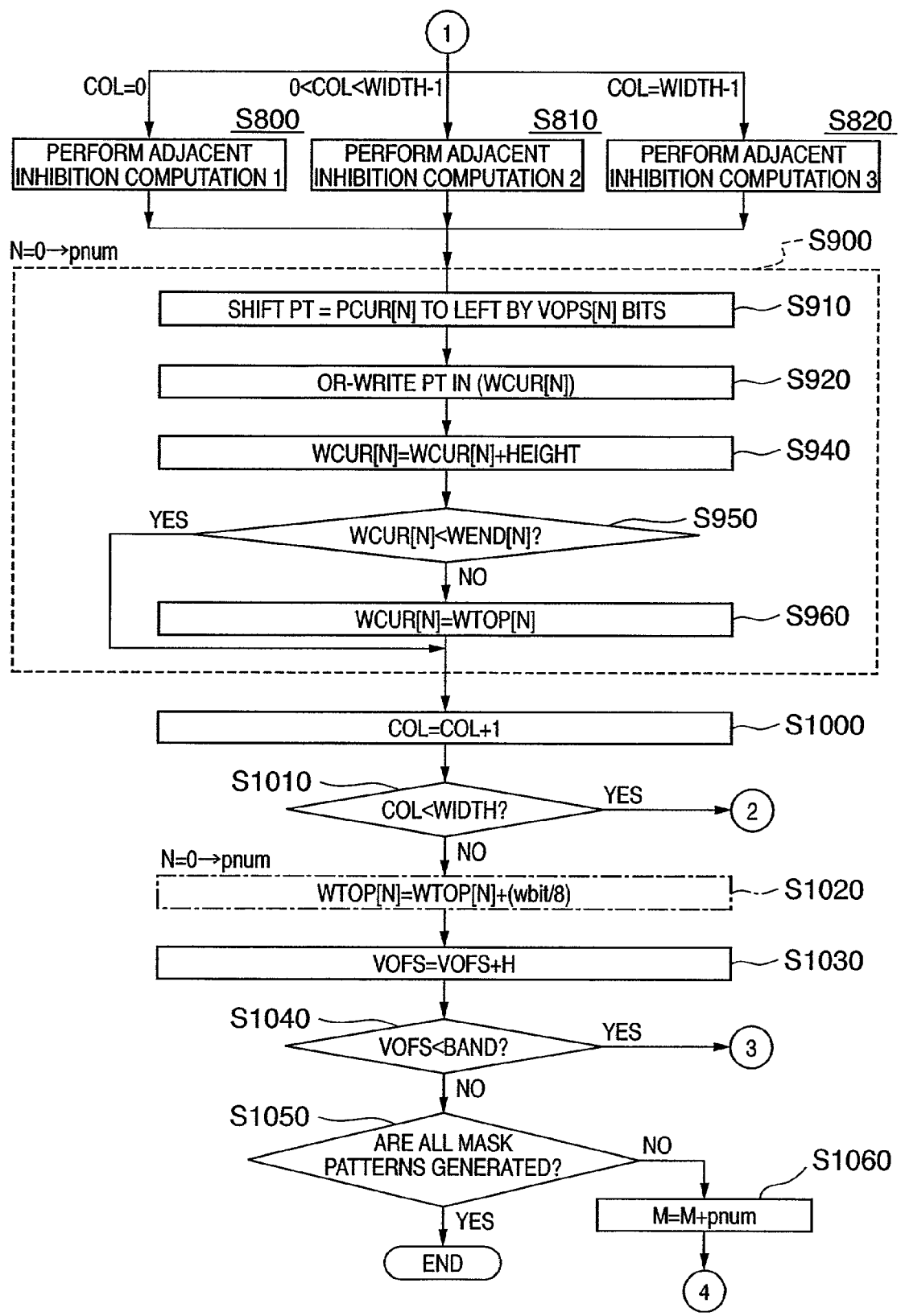
FIG. 15B is a flow chart showing a specific example of mask pattern generation processing according to the embodiment of the present invention.

FIGS. 15A and 15B are flow charts showing a specific example of the processing in step S340 according to the embodiment of the present invention.

Referring to FIGS. 15A and 15B, "pnum" is a constant indicating the number of dots to be interpolated, which is defined as "4" when 4-dot interpolation described with reference to FIGS. 9A and 9B is performed, and "wbit" represents the maximum number of bits in one band process. That is, the amount wbit determines the number of bits of a mask pattern which can be generated at once in the sub-scanning direction. In addition, a bit shift amount in write operation is designated to set a maximum amount of wbit−1. If, for example, wbit is set to 8, pattern data of a maximum of 8 bits can be shifted by 7 bits at maximum.

Since such bit shift operation can be performed by, for example, a general-purpose register incorporated in a CPU, the set value of wbit is preferably set to ½ the bit length of the general-purpose register that can be used for bit shift operation. Since the CPU 402 in this embodiment incorporates a 32-bit general-purpose register, and 15-bit shift operation can be done at once in accordance with a bit shift instruction within 32 bits, wbit is defined as 16.

The steps enclosed with the chain lines in FIGS. 15A and 15B indicated repetitive processes, and "N=0→pnum" represents that the step enclosed with the chain line is started from N=0, N=N+1 is set in each cycle, and the processing enclosed with the chain line is repeated while N<pnum is satisfied.

The variables used in FIGS. 15A and 15B are ensured in the mask process work area 430a in the SRAM 430 described with reference to FIG. 5. Only variables that are frequently used are ensured to minimize the number of variable ensured, thus reducing the occupancy ratio in the RAM 403.

HEIGHT temporarily stores BUF_HEIGHT (632) representing the height of the mask buffer in the number of bytes.

WIDTH temporarily stores the value of BUF_WIDTH 633 representing a mask buffer width in the number of columns.

M temporarily stores the read start position of the data 4 (650) as the detailed mask information in FIG. 8.

N temporarily stores the array number of an array type variable with [N].

BAND temporarily stores the value of band height BAND_HEIGHT 661 for data 4 as the detailed mask information in FIG. 8.

VH temporarily stores the height amount of unprocessed band.

VOFS temporarily stores the height amount of processed band.

H temporarily stores the height amount of band to be processed in a pattern generation/write cycle during band processing.

W temporarily stores an operation counter value during band processing.

R temporarily stores the value obtained as the random value is changed from 0 to pnum−1 during band processing.

COL temporarily stores a processing target column position in a band.

In addition, in SRND (not shown), the read start address of the random number table indicated by RND in step S320 in FIG. 14 is set. PT is a 32-bit work register used for one mask pattern write.

Referring to FIGS. 15A and 15B, each reference symbol with [N] denotes an array type variable. Each variable constituted by pnum array type variables and includes the following.

First of all, VOPS[N] temporarily stores the value obtained for each complementary pattern by dividing the remainder of the quotient obtained by dividing BAND_POS 662 in FIG. 8 by wbit, i.e., the band start position for each complementary pattern.

WTOP[N] temporarily stores the value obtained by adding the quotient obtained by dividing BAND_POS 662 by wbit to the sum of mask buffer start address MSK_TOP and BUF_TOP 663 in FIG. 8. That is, WTOP[N] temporarily stores an address value for a mask buffer indicating the 0 column position of a band for each complementary pattern.

WEND[N] temporarily stores the value obtained by adding a buffer size (buffer height HEIGHT*buffer width WIDTH) to the sum of mask buffer start address MSK_TOP and BUF_TOP 663. That is, WEND[N] temporarily stores an address value for a mask buffer indicating the "last column+1" position of a band for each complementary pattern.

WCUR [N] temporarily stores a write address for a mask buffer for a band for each complementary pattern.

HOFS[N] temporarily stores the value obtained by multiplying offset column count HPOS 664 in FIG. 8 for a band for each complementary pattern by buffer height HEIGHT. That is, HOFS[N] temporarily stores a write offset amount.

PCUR[N] temporarily stores mask pattern data (the number of bits of wbit) in one generation/write cycle for a band for each complementary pattern.

The following array type variables are used for the adjacent dot inhibition computation described with reference to FIG. 12C, and used only in the processed indicated by the underlined step numbers (steps S800 to S830) in FIG. 15B. These variables are the same as those used for the adjacent dot inhibition computation described with reference to FIG. 12C.

PPRV[N] temporarily stores the mask pattern data (the number of bits of wbit) of an adjacent column (immediately preceding column) of a band for each of complementary patterns identical to PT1p to PTNp in FIG. 12C. P1ST[N] temporarily stores the mask pattern data (the number of bits of wbit) of the first column of a band for each of complementary patterns identical to PT1s to PTNs in FIG. 12C. Note that if a mask pattern not requiring adjacent dot inhibition is to be generated, PPRV[N] and P1ST[N] are not required.

In addition, the steps indicated by the underlined step numbers (steps S800 to S830) are processes for the adjacent dot inhibition computation described with reference to FIG. 12C, but are not included when a mask pattern not requiring adjacent dot inhibition is to be generated.

Referring to FIG. 15A, "X+Y" indicates a mathematical expression for adding X and Y; X−Y, a mathematical expression for subtracting Y from X; "X*Y", a mathematical expression for multiplying X by Y; "X/Y", a mathematical expression for obtaining a quotient by dividing X by Y; and "X % Y", a mathematical expression for obtaining the remainder of the quotient obtained by dividing X by Y.

The processing shown in FIG. 15A is stared when step S340 in FIG. 14 is executed. Assume that in the following processing, the embodiment in the case of the above 4-dot interpolation, i.e., pnum=4, will be exemplified.

First of all, steps S500 to S520 are initialization processing in this processing.

A byte count representing the height of one column of a mask buffer is set in HEIGHT (step S500). A column count of the mask buffer width is set in WIDTH (step S510). M is then initialized to 0 to read out the first part of the detailed mask information of the mask pattern to be generated (step S520).

With this operation, mask information is read out from parameters 661 to 664 of data 4 of A1 indicated by an arrow a in FIG. 8. This processing is basically formed from four nested loop processes. If these loops are defined as first, second, third, and fourth loops in the inward direction, the first loop corresponds to steps S530 to S1060, in which the flow returns to step S530 every time one set of band information is generated. This processing is repeated until mask patterns based on all band information registered in data 4 (650) as the detailed mask information in FIG. 8 are completely generated.

The second loop corresponds to steps S570 to S1040, in which the flow returns to step S570 every time mask pattern data for each band is generated by a unit amount corresponding to a height equal to or less than wbit. This processing is repeated until processed band height VOFS becomes band height BAND.

The third loop corresponds to steps S640 to S1010, in which the flow returns to step S640 every time a pattern is written once by a height amount corresponding to a wbit unit. This processing is repeated until pattern data in a unit amount corresponding to a height equal to or more than wbit is generated by an amount corresponding to the column count of mask buffer width WIDTH.

The fourth loop corresponds to steps S660 to S700, in which the flow returns to step S660 every time mask pattern data is generated by one bit. This processing is repeated until mask pattern data is completely generated by a bit count corresponding to a band height to be processed in one mask pattern generation/write cycle.

The processing in these loops will be described in detail below.

In step S530 at the entry of the first loop, (1) to (4) in step S530 are repeated four times to execute the following processing:

(1) setting the bit start position of the A1 band to VOPS [0], (2) setting the buffer address of the 0 column position of the A1 band to WTOP[0], (3) setting the buffer address of the "last column +1" position of the A1 band to WEND[0], and (4) setting the write offset amount of the A1 band to HOFS[0].

By repeating (1) to (4) three times, the bit start positions of the B1, C1, and D1 bands are set to VPOS[1], VPOS[2], and VPOS[3]; the buffer addresses of 0 column positions of the B1, C1, and D1 bands, to WTOP[1], WTOP[2], and WTOP[3]; the buffer addresses of the "last column +1" positions of the B1, C1, and D1 bands, to WEND[1], WEND[2], and WEND[3]; and the write offset amounts of the B1, C1, and D1 bands, to HOFS[1], HOFS[2], and HOFS[3].

Subsequently, the band heights of A1 to D1 are set to BAND (step S540). A band height to be processed is set to VH (step S550). Processed band height VOFS is initialized to 0 to start band processing (step S560).

In steps S570 to S610 at the entry of the second loop, the height amount of a band to be processed in a mask pattern generation/write cycle in band processing is set to be equal to or less than wbit in H, and band height VH to be processed is updated.

If band height VH to be processed is larger than wbit (YES in step S570), wbit is set to H (step S580), and wbit is subtracted from VH (step S590). The flow then advances to step S620.

If band height VH is equal to or less than wbit (NO in step S570), VH is set to H (step S600). Since there is no band height to be processed, VH is reset to 0 (step S610), and the flow advances to step S620.

Subsequently, in steps S620 and S630, the third loop processing starting from step S640 is initialized.

More specifically, the sum of address value WTOP[0] indicating the 0 column position of the A1 band and write offset amount HOFS[0] of the A1 band is set as a write address value for the mask buffer of the A1 band to WCUR [0] (step S620).

This processing is repeated three times to set the resultant values as write address values for the mask buffers of the B1, C1, and D1 bands to WCUR[1], WCUR[2], and WCUR[3]. The processing target column position is then reset to 0 (step S630).

In steps S640 and S650 at the entry of the third loop, the fourth loop processing starting from step S660 is initialized.

More specifically, mask pattern data PCUR[0] of the A1 band is reset to 0 (step S640).

This processing is repeated three times to reset PCUR[1] for the B1 band, PCUR[2] for the C1 band, and PCUR[3] for the D1 band to 0. Height amount H of band to be processed in a pattern generation/write cycle in band processing is set in the operation counter W which determines the loop count of the fourth loop in steps S660 to S700 (step S650).

In the fourth loop, first of all, the random number table is read out from SRND. Since pnum=4, random number values 0 to 3 are set in R, and the read position of SRND is updated as needed (step S660). If, for example, random number values are generated within the range of 0 to 3, the values of the random number table may be used two bits at a time. If, for example, the word length of the ROM 411 in which the random number table is stored is 16 bits, 16-bit random data is actually read out from the ROM 411 once per generation of eight random numbers (=16 bits/2 bits).

Each of PCUR[0] to PCUR[3] is then shifted to left by one bit (step S670), and the D0 bit is set to 1 in only PCUR[random number value R] (step S680).

With this operation, if, for example, R=0, a bit is set in PCUR[0] for the A1 band. If R=1, a bit is set in PCUR[1] for the B1 band. If R=2, a bit is set in PCUR[2] for the C1 band. If R=3, a bit is set in PCUR[3] for the D1 band. With this operation, a random mask pattern is generated in the sub-scanning direction.

Since a 1-bit mask pattern is generated in step S680, the operation work counter W is decremented (step S690). If W is larger than 0 (YES in step S700), the flow returns to step S660. When W becomes 0 (NO in step S700), i.e., mask pattern data is completely generated by a predetermined bit height amount in one target column, the flow advances to the processing shown in FIG. 15B.

Steps S800, S810, and S820 in FIG. 15B exist only in mask pattern generation processing demanding adjacent dot inhibition computation, and adjacent dot inhibition computation 1 in step S800 is executed when target column position COL is 0, i.e., at the time of the first column.

If COL is larger than 0 (not the first column) and equal to mask width WIDTH−1 (not the last column), adjacent dot inhibition computation 2 in step S810 is executed. Otherwise, i.e., when COL is equal to mask width−1 (the last column), adjacent dot inhibition computation 3 in step S830 is executed.

Note that since adjacent dot inhibition computation 1 in step S800 for the column A described with reference to FIG. 12C, adjacent dot inhibition computation 2 in step S810 for the columns B and C, and adjacent dot inhibition computation 3 in step S820 for the column D are completely the same, a detailed description thereof will be omitted.

In step S900 (steps S910 to S960 are repeated pnum times), the mask pattern generated by the above processing is written in the designated mask data area 403b in the RAM 403.

First of all, the data obtained by bit-shifting mask pattern PCUR[0] of the A1 band to left by an amount corresponding to band start position VPOS[0] of the A1 band is generated in PT (step S910). PT is OR (logical sum)-written at the memory position indicated by write address WCUR[0] for the mask buffer for the A1 band (step S920).

When wbit=16, PT becomes 32 bits, and the address indicated by WCUR[N] indicates the physical address of 2n (the address value set when 1 is regarded as 1 byte). Depending on the type of CPU or the control scheme for a memory control circuit, 32-bit memory write operation is allowed only with a physical address of 4n.

In such a case, the lower 16 bits of PT may be OR (logical sum)—written at the address indicated by WCUR [N], and the upper 16 bits of PT may be OR (logical sum)—written at the address indicated by WCUR[N]+2 (the address value set when 1 is regarded as 1 byte).

Subsequently, in steps S940 to S960, write address WCUR[0] for the mask buffer for the A1 band is updated.

More specifically, buffer height HEIGHT is added to WCUR[0] (step S940). If WCUR[0] is smaller than address value WEND[0] of last column position+1 of the A1 band (YES in step S950), writing of the A1 band is terminated. If WCUR[0] is equal to or larger than WEND[0] (NO in step S950), WCUR[0] is changed to buffer address WTOP[0] of the 0 column position of the A1 band (step S960), and writing of the A1 band is terminated.

Steps S910 to S960 are then repeated three times to write the B1, C1, and D1 bands and update write addresses WCUR[1], WCUR[2], and WCUR[3] as in the case with the A1 band.

Subsequently, column position COL is updated (step S1000). If COL is less than buffer width WIDTH (YES in step S1010), the flow returns to step S640 as the first step in the third loop. If COL becomes equal to WIDTH, the third loop is terminated. If COL is larger than buffer width WIDTH (NO in step S1010), the flow advances to step S1020.

In step S1020, the buffer addresses of the 0 column positions of the A1 to D1 bands are updated.

More specifically, the quotient obtained by dividing wbit by 8 (the value obtained by converting wbit into the number of bytes) is added to buffer address WTOP[0] of the 0 column position of the A1 band. This is because mask pattern data for the A1 band is generated by an amount corresponding to the height of wbit in the third loop. As in the case with the A1 band, the quotient obtained by dividing wbit by 8 (the value obtained by converting wbit into the number of bytes) is added to WTOP[1] for the B1 band, WTOP[2] for the C1 band, and WTOP[3] for the D1 band.

Subsequently, VOFS is updated by adding band height H generated in the third loop to processed band height VOFS (step S1030).

If VOFS is less than height BAND of the A1 band (YES in step S1040), the flow returns to step S570 as the first step in the second loop. If processed band height VOFS becomes equal to height BAND of the A1 band, it means that mask patterns for the A1, B1, C1, and D1 bands are completed.

It is then checked whether all the mask patterns are completed (step S1050). If there is any mask pattern to be generated (NO in step S1050), pnum is added to read position M of detailed mask information (step S1060).

More specifically, after settings are made to allow acquisition of parameters for the A2, B2, C2, and D2 bands of data 4 (650) as the detailed mask information in FIG. 8, which start from an arrow b, the flow returns to step S530 as the first step in the first loop to generate mask patterns for the remaining A2 to D2 bands by the same processing in the first to fourth loops following the same procedures as those for A1 to D1.

Since the above description can apply to this processing by replacing A1, B1, C1, and D1 with A2, B2, C2, and D2, respectively, a detailed description of the method of generating mask patterns for the A2 to D2 bands will be omitted.

When all the mask patterns are generated (YES in step S1050), the processing is terminated. In this case, the lookup source can continuously use the random number table by using the last read position (of SRND) of the random number table as a return value.

With this operation, when mask patterns in different forms are required, even if different mask patterns in the same form have been generated by continuously using random number information, each column pattern of the different mask patterns are generated to be different at the same column positions each other. This makes it possible to avoid problems such as pattern tuning among different mask patterns.

As described above, according to this embodiment, when multipass printing is performed by using an arrangement having printing elements arranged in the sub-scanning direction, e.g., a nozzle array, the number of interpolation dots in the sub-scanning direction can be set to 2n+1, i.e., an odd number.

It is known that as the resolution of printing elements in the sub-scanning direction increases in such an arrangement, a plurality of nozzle arrays tend to be used in correspondence with one print color (ink color). For example, a method is available, in which nozzle arrays corresponding to one print color are separately arranged at odd-numbered dot positions and even-numbered dot positions in a staggered arrangement when viewed from the sub-scanning direction.

By separately arranging printing elements in this manner, an increase in resolution can be relatively easily attained. However, when printing elements such as nozzles are separated from each other physically and electrically, characteristic variations may occur between nozzle arrays. For example, if printing elements are arranged in two different arrays, characteristics may slightly differ between an odd-numbered dot position and an even-numbered dot position.

Conventionally, when multipass printing is performed with this arrangement, since the number of interpolation dots in the sub-scanning direction is 2n, an interpolation relationship is always established between dots printed by printing elements at odd-numbered dot positions and between dots printed by printing elements at even-numbered dot positions.

As a result, in the worst case, an image printed at an odd-numbered dot position interferes with an image printed at an even-numbered dot position. In addition, print density differences or gradients or differences in physical positions such as landing positions or landing areas are produced. As a consequence, density irregularity, streaks, and the like are produced in printed images.

By using the interpolation scheme of this embodiment described above, the outputs obtained by thinning-out printing alternately using printing elements at odd-numbered and even-numbered positions in the sub-scanning direction can be interpolated with each other. Even if, therefore, characteristic variations are caused between odd-numbered dot positions and even-numbered dot positions, since images are averaged and printed out on a printing medium, density irregularity, streaks, and the like can be suppressed.

In addition, even if the relationship between the convey resolution in the sub-scanning direction and the array resolution of printing elements in the sub-scanning direction is not defined by 2n or 1/2n, multipass printing can be done. This makes it possible to output an image with reduced density irregularity, streaks, and the like.

Furthermore, since the ratio between the convey resolution in the sub-scanning direction and the array resolution of printing elements in the sub-scanning direction can be set to, for example, 3:2 (400 dpi:600 dpi), an increase in the convey speed of the convey system and a reduction in noise can be achieved without decreasing the print density on a printing medium in the main scanning direction. In addition, increases in the cost of the mechanical parts of the convey system and the like can be suppressed.

The printing modes in the above embodiment are acquired from the host computer 500. However, for example, even in an image printing apparatus designed to print images by bitmapping character and image data into print image data by itself or an apparatus designed to print images while reading out data from an external storage device such as a flash memory device or the like and performing image processing such as color processing and halftoning, printing can be done upon determination of the above printing modes in accordance with the printing medium to be used and print quality. Moreover, a mechanism which can automatically detect the type of printing medium may be mounted in an image printing apparatus to determine a printing mode in accordance with the determination result.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,73,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal.

By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558, 333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a signal printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for printing head, capping means cleaning means, pressurization or suction means, and preliminary heating means using electrothermal transducers, another heating element, or a combination thereof. It is also effective for stable printing to provide a preliminary discharge mode which performs discharge independently of printing.

In addition to the print mode of printing images only in a main color such as black, the printer may have at least one of the print mode of printing images in different colors and the print mode of printing images in full-color as a mixture of colors, which mode may be realized by an integral printhead or a combination of a plurality of printheads.

Note that the present invention may be applied to either a system constituted by a plurality of devices (e.g., a host computer, an interface device, a reader, a printer, and the like), or an apparatus consisting of a single device (e.g., a copying machine, a facsimile apparatus, or the like).

The objects of the present invention can also be achieved by directly or remotely supplying software programs (corresponding to the flow charts shown in the accompanying drawings in the embodiment) for implementing the functions of the above embodiment, and causing a computer in the system or apparatus to read out and execute the supplied program codes. This implementation means need not take the form of programs as long as it has the functions of the programs.

In this case, the program codes themselves installed in the computer to cause the computer to realize the functional processing of the present invention constitute the present invention. That is, the present invention incorporates the computer programs themselves which realize the functional processing of the present invention.

In this case, this implementation means is not limited to any program forms, e.g., object codes, programs executed by an interpreter, and script data supplied to an OS, as long as it has the functions of the programs.

As the storage medium for supplying the program code, for example, a floppy (trade name) disk, hard disk, optical disk, magneto-optical disk, MO, CD-ROM, CD-R, magnetic tape, nonvolatile memory card, ROM, DVD (DVD-ROM or DVD-R), and the like may be used.

Other methods of supplying programs include a method of connecting to a homepage in the Internet by using a browser in a client computer and downloading the computer programs of the present invention themselves or a compressed file having an automatic install function from the homepage into a recording medium such as a hard disk. In addition, the objects of the present invention can also be realized by dividing the program codes constituting the programs of the present invention into a plurality of files and downloading the respective files from different homepages. That is, the present invention includes a WWW server which allows a plurality of users to download the program files for causing computers to implement the functional processing of the present invention.

The objects of the present invention can also be realized by distributing the programs of the present invention to users after they are encrypted and stored in storage media such as CD-ROMs, allowing a user who has cleared predetermined conditions to download key information for decrypting the programs from a homepage through the Internet, and letting the user execute the encrypted programs by using the key information and install them in the computer.

The functions of the above embodiment may be realized not only by executing the readout programs by the computer but also by some or all of actual processing operations executed by an OS running on the computer on the basis of instructions of the programs.

Furthermore, the functions of the above embodiment may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for forming an image on a printing medium by complementarily printing thinned-out images while scanning a printhead having a plurality of printing elements over a predetermined area on the printing medium in a main scanning direction a predetermined number of times through at least one scan in a sub-scanning direction comprising:

generating means for generating a mask pattern by performing generation of patterns corresponding to the predetermined number of times in the sub-scanning direction in accordance with the number of printing elements of the printhead which corresponds to an amount by which the scan is performed once in the sub-scanning direction, and repeating the generation by the number of times corresponding to a predetermined number of columns;

storage means for storing the mask pattern generated by said generating means;

printing means for printing an image for each printing timing signal in the main scanning direction by using image data and the mask pattern stored in said storage means; and random number generating means for generating random numbers;

wherein said generating means is capable of
i) selecting a plane of a plurality of planes for generating the mask pattern on the basis of random number values generated by said random number generating means;
ii) setting bit information to a target bit position of a target column of the selected plane, which target bit position is different from a target bit position of the same target column of a previously selected plane in step i);
iii) repeating steps i) and ii) for the number of times corresponding to the number of lines in one column of the selected plane; and
iv) executing step iii) for every column of the plane.

2. The apparatus according to claim 1, wherein said generating means generates the mask pattern such that dots on adjacent columns in the mask pattern which correspond to the same printing element of the printhead become at least discontinuous.

3. The apparatus according to claim 1, wherein said generating means generates the mask pattern on the basis of mask pattern control information for generating a plurality of mask patterns corresponding to a plurality of printing modes.

4. The apparatus according to claim 3, wherein the mask pattern control information includes position information of printing elements of the printhead in the sub-scanning direction which correspond to mask patterns having at least an interpolation relationship.

5. The apparatus according to claim 1, further comprising changing means for changing the amount of scanning in the sub-scanning direction and the mask pattern in accordance with a printing mode.

6. The apparatus according to claim 1, wherein the apparatus further comprises a CPU which controls the printing apparatus and a memory connected to a local bus of said CPU, and said generating means generates the mask pattern by loading a mask pattern generation program for generating the mask pattern into said memory and executing the program.

7. The apparatus according to claim 1, wherein the number of printing elements of the printhead which corresponds to the amount of scanning in the sub-scanning direction is 2n+1.

8. The apparatus according to claim 1, wherein said printing means prints an image by using the image data and the mask pattern on the basis of printing control information for performing printing control by using the mask pattern.

9. The apparatus according to claim 8, wherein the printing control information includes at least the number of mask patterns, the number of columns, and a column read position change amount of the mask pattern for each scan in the main scanning direction.

10. The apparatus according to claim 1, wherein the printhead uses an ink-jet printing scheme of printing by discharging ink.

11. A control method for a printing apparatus for forming an image on a printing medium by complementarily printing thinned-out images while scanning a printhead having a plurality of printing elements over a predetermined area on the printing medium in a main scanning direction a predetermined number of times through at least one scan in a sub-scanning direction comprising the steps of:

the generating step of generating a mask pattern by performing generation of patterns corresponding to the predetermined number of times in the sub-scanning direction in accordance with the number of printing elements of the printhead which corresponds to an amount by which the scan is performed once in the sub-scanning direction, and repeating the generation by the number of times corresponding to a predetermined number of columns;

the storage step of storing the mask pattern generated in the generating step;

the printing step of printing an image for each printing timing signal in the main scanning direction by using image data and the mask pattern stored in the storage step; and the random numbers generating step of generating random numbers using random number generating means;

wherein the generating step includes:
i) selecting a plane of a plurality of planes for generating the mask pattern on the basis of random number values generated by said random number generating means;
ii) setting bit information to a target bit position of a target column of the selected plane, which target bit position is different from a target bit position of the same target column of a previously selected plane in step i);
iii) repeating steps i) and ii) for the number of times corresponding to the number of lines in one column of the selected plane; and
iv) executing step iii) for every column of the plane.

12. The method according to claim 11, wherein in the generating step, the mask pattern is generated such that dots on adjacent columns in the mask pattern which correspond to the same printing element of the printhead become at least discontinuous.

13. The method according to claim 11, wherein in the generating step, the mask pattern is generated on the basis of mask pattern control information for generating a plurality of mask patterns corresponding to a plurality of printing modes.

14. The method according to claim 13, wherein the mask pattern control information includes position information of printing elements of the printhead in the sub-scanning direction which correspond to mask patterns having at least an interpolation relationship.

15. The method according to claim 11, further comprising the changing step of changing the amount of scanning in the sub-scanning direction and the mask pattern in accordance with a printing mode.

16. The method according to claim 11, wherein the apparatus further comprises a CPU which controls the printing method and a memory connected to a local bus of the CPU, and in the generating step, the mask pattern is generated by loading a mask pattern generation program for generating the mask pattern into the memory and executing the program.

17. The method according to claim 11, wherein the number of printing elements of the printhead which corresponds to the amount of scanning in the sub-scanning direction is 2n+1.

18. The method according to claim 11, wherein in the printing step, an image is printed by using the image data and the mask pattern on the basis of printing control information for performing printing control by using the mask pattern.

19. The method according to claim 18, wherein the printing control information includes at least the number of mask patterns, the number of columns, and a column read position change amount of the mask pattern for each scan in the main scanning direction.

20. The method according to claim 11, wherein the printhead uses an ink-jet printing scheme of printing by discharging ink.

* * * * *